(12) United States Patent
Takizawa

(10) Patent No.: US 12,362,784 B2
(45) Date of Patent: Jul. 15, 2025

(54) RELAY STATION, TRANSMISSION METHOD FOR RELAY STATION, AND COMMUNICATION SYSTEM

(71) Applicant: TOYOTA JIDOSHA KABUSHIKI KAISHA, Toyota (JP)

(72) Inventor: Kenichi Takizawa, Koganei (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 56 days.

(21) Appl. No.: 18/447,017

(22) Filed: Aug. 9, 2023

(65) Prior Publication Data

US 2024/0056126 A1 Feb. 15, 2024

(30) Foreign Application Priority Data

Aug. 10, 2022 (JP) .................................. 2022-128187
Sep. 28, 2022 (JP) .................................. 2022-155314

(51) Int. Cl.
*H04B 1/38* (2015.01)
*H04B 7/024* (2017.01)
*H04B 7/155* (2006.01)
*H04L 25/20* (2006.01)

(52) U.S. Cl.
CPC ......... *H04B 7/024* (2013.01); *H04B 7/15592* (2013.01); *H04L 25/20* (2013.01)

(58) Field of Classification Search
CPC .. H04B 7/024; H04B 7/15592; H04B 7/0676; H04B 7/15585; H04B 7/0671; H04L 25/20; H04W 56/0055
USPC ........................................................ 375/219
See application file for complete search history.

(56) References Cited

U.S. PATENT DOCUMENTS

2006/0270341 A1* 11/2006 Kim ...................... H04W 72/21
455/16

FOREIGN PATENT DOCUMENTS

WO WO 2006/121381 A1 11/2006

OTHER PUBLICATIONS

H. Chen, et al., "Filter-and-Forward Distributed Beamforming in Relay Networks with Frequency Selective Fading", IEEE Trans. On Signal Processing, vol. 58, No. 3, Mar. 2010.
M. Noguchi, et al., "A Single Frequency Full-Duplex Radio Relay Station for Frequency Domain Equalization Systems", Technical Report of The Institute of Electronics, Information and Communication Engineers, vol. SIP 2011-109, Jan. 2012.

* cited by examiner

*Primary Examiner* — Helene E Tayong
(74) *Attorney, Agent, or Firm* — Finnegan, Henderson, Farabow, Garrett and Dunner, LLP

(57) ABSTRACT

A first relay station capable of performing, together with a second relay station, a non-replay relay for a first radio signal transmitted from a transmitting station for a receiving station having one antenna includes an antenna, a radio and a controller. The radio includes a receiver that converts the first radio signal into a baseband signal, an FIR filter that adds a delay to the baseband signal, and a transmitter that converts the signal output from the FIR filter into a second radio signal transmitted from the antenna to the receiving station. The controller ensures that the second radio signals transmitted from the respective antennas of the first and second relay stations have different delays, and that the FIR filter The delay is set in the FIR filter.

20 Claims, 24 Drawing Sheets

Example : In a case where each of two relay stations has a single antenna (method A).

Example : In a case where each of two relay stations has two antennas (method A).

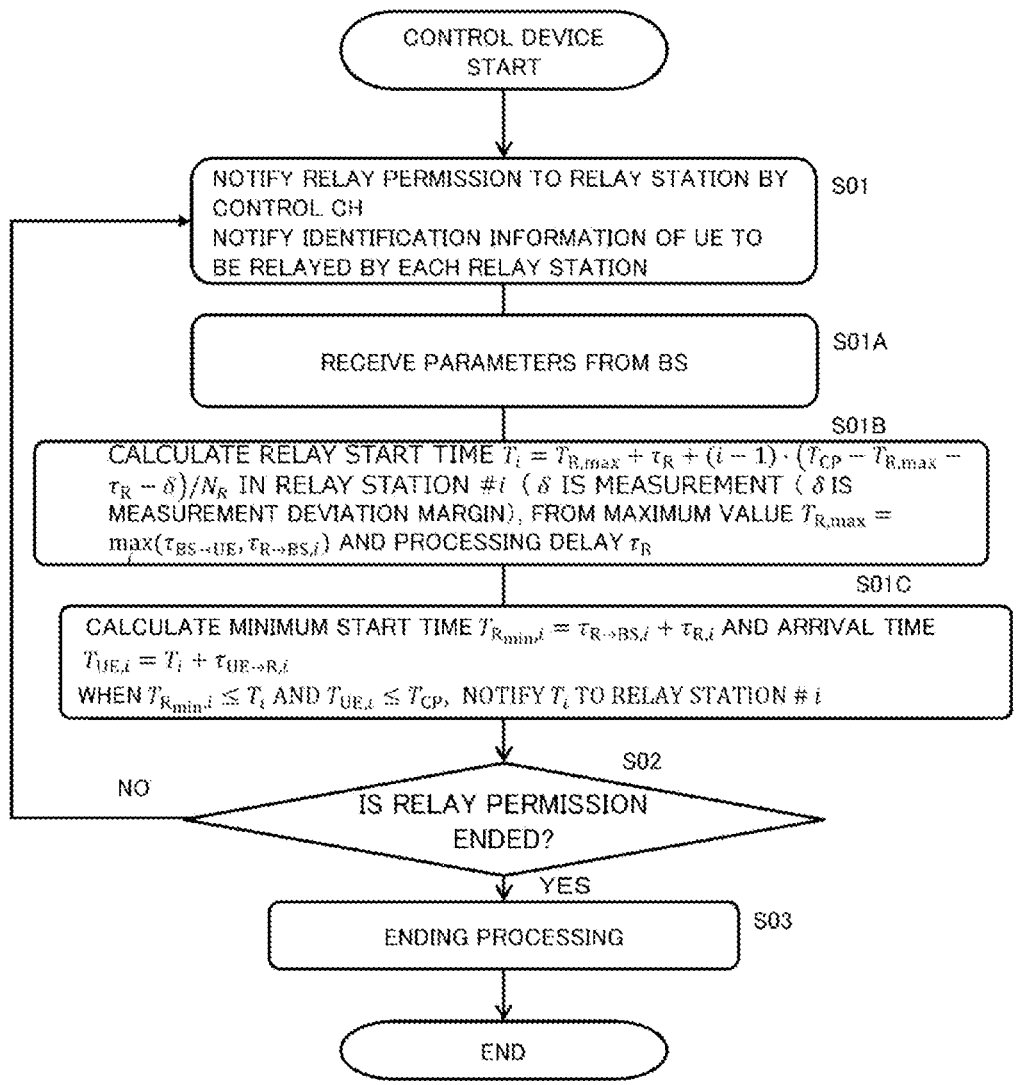

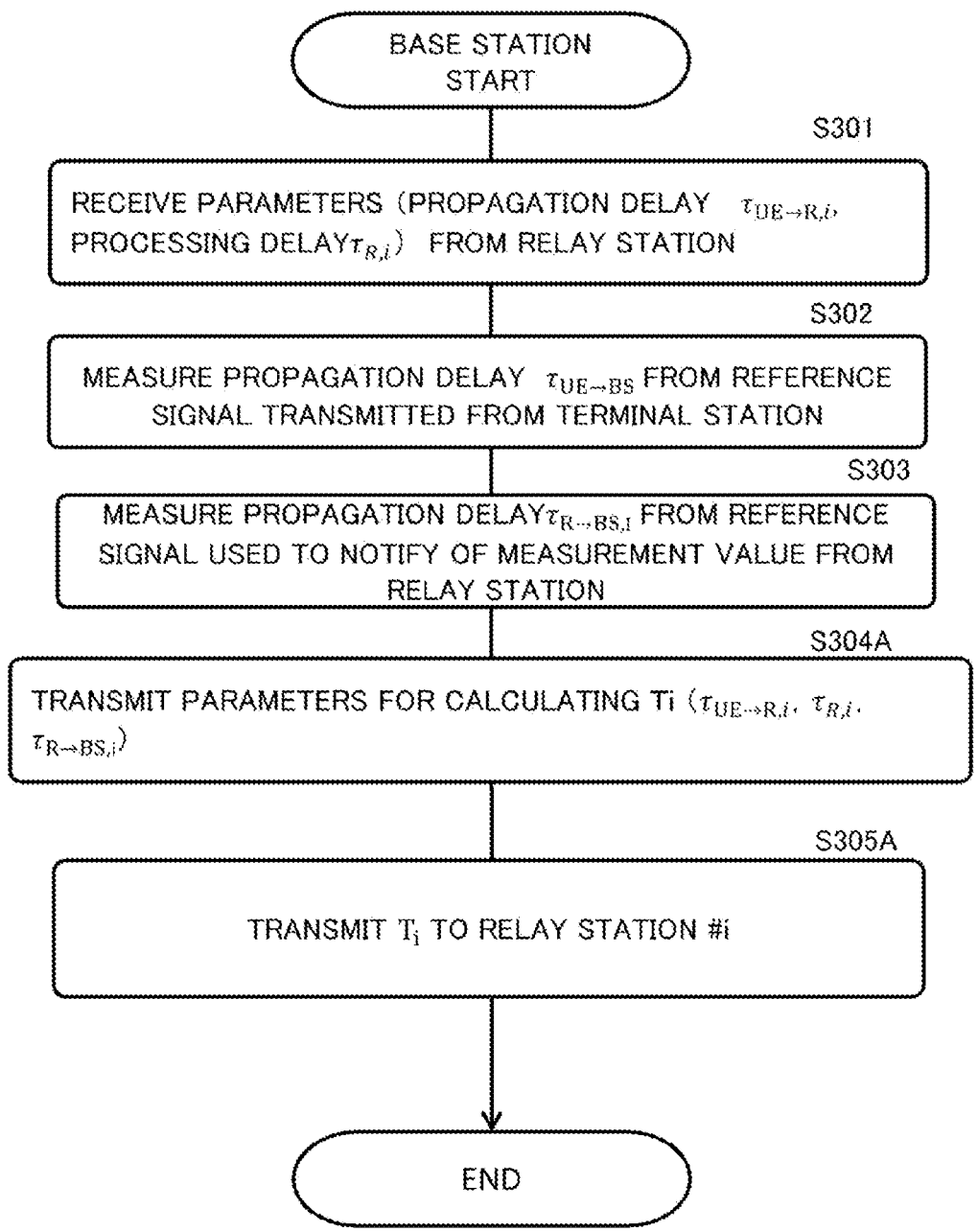

RELAY STATION, TRANSMISSION METHOD FOR RELAY STATION, AND COMMUNICATION SYSTEM

CROSS REFERENCE TO THE RELATED APPLICATION

This application claims the benefits of Japanese Patent Application No. 2022-128187, filed on Aug. 10, 2022 and Japanese Patent Application No. 2022-155314, filed on Sep. 28, 2022, which are hereby incorporated by reference herein in its entirety.

BACKGROUND

1. Technical Field

The present disclosure relates to a relay station, a transmission method for the relay station, and a communication system.

2. Description of the Related Art

In wireless communications such as the 5th Generation Mobile Communication System (5G), communications with an ultra-low delay of sub-milliseconds or less are expected. On the other hand, from the viewpoint of improvement of communication services, it is desired to expand a coverage area of cells, and to this end, relay communication via relay stations is effective. Therefore, a wireless communication method, in which a terminal station that performs wireless communication is used as a relay station, has been proposed. Furthermore, non-regenerative relay, in which demodulation and decoding are not performed at a relay station, is desirable as a relay technology with less delay. For further information, see H. Chen. A. B. Gershman, and S. Shahbazpanahi, "Filter-and-Forward Distributed Beamforming in Relay Networks with Frequency Selective Fading", IEEE Trans. On Signal Processing, vol. 58, no. 3, March 2010, and Noguchi, Hayashi, Kaneko, Sakai, "A Single Frequency Full-Duplex Radio Relay Station for Frequency Domain Equalization Systems," IEICE Technical Report, vol. SIP2011-109, January, 2012.

SUMMARY

An object of the present disclosure is to provide a relay station, a transmission method therefor, and a communication system that allow a reception station to obtain a preferable diversity effect.

Aspects of the present disclosure may include a relay station operating as a first relay station, and capable of executing non-regenerative relay for a first radio signal transmitted from a transmission station toward a reception station having one antenna, together with one or two or more second relay stations, the relay station comprising:
  at least one antenna;
  a wireless device corresponding to the antenna: and
  a controller configured to control an operation of the wireless device, wherein
  the wireless device includes
    a receiver configured to convert the first radio signal received by the antenna into a baseband signal,
    an FIR filter configured to assign a delay to the baseband signal, and
    a transmitter configured to convert a signal output from the FIR filter into a second radio signal transmitted toward the reception station from the antenna, and wherein
  the controller sets a delay amount in the FIR filter of the wireless device so that the second radio signal transmitted from each antenna included in the first and second relay stations has a delay different between the first and second relay stations.

The aspects of the present disclosure may include a transmission method for a relay station operating as a first relay station and capable of executing non-regenerative relay for a first radio signal transmitted from a transmission station toward a reception station having one antenna, together with one or two or more second relay stations, the transmission method comprising:
  converting, by the relay station, the first radio signal received by at least one antenna included in the relay station into a baseband signal;
  assigning, by the relay station, a delay to the baseband signal using an FIR filter;
  converting, by the relay station, a signal output from the FIR filter into a second radio signal transmitted toward the reception station from the antenna; and
  setting, by the relay station, a delay amount in the FIR filter so that the second radio signal transmitted from each antenna included in the first and second relay stations has a delay different between the first and second relay stations.

The aspects of the present disclosure may include a communications system comprising: a reception station with one antenna; a transmission station configured to transmit a first radio signal to the reception station; and a plurality of relay stations capable of relaying the first radio signal to the reception station through non-regenerative relay, wherein each of the plurality of relay stations includes:
  at least one antenna, a wireless device corresponding to the antenna, and a controller configured to control an operation of the wireless device,
  the wireless device includes a receiver configured to convert the first radio signal received by the antenna into a baseband signal, a finite impulse response (FIR) filter configured to assign a delay to the baseband signal, and
  a transmitter configured to convert a signal output from the FIR filter into a second radio signal transmitted from the antenna to the reception station, and wherein
  the controller sets a delay amount in the FIR filter of the wireless device so that the second radio signal transmitted from each antenna of the plurality of relay stations has a delay different from among the plurality of relay stations.

According to the disclosure, the receiving station enable to obtain a suitable diversity effect.

BRIEF DESCRIPTION OF THE DRAWINGS

FIG. 23 is a flowchart illustrating an example of processing of a control device in a modification example of the fourth embodiment; and FIG. 24 is a flowchart illustrating an example of processing of a base station in the modification example of the fourth embodiment.

DESCRIPTION OF THE EMBODIMENTS

Figure 1:
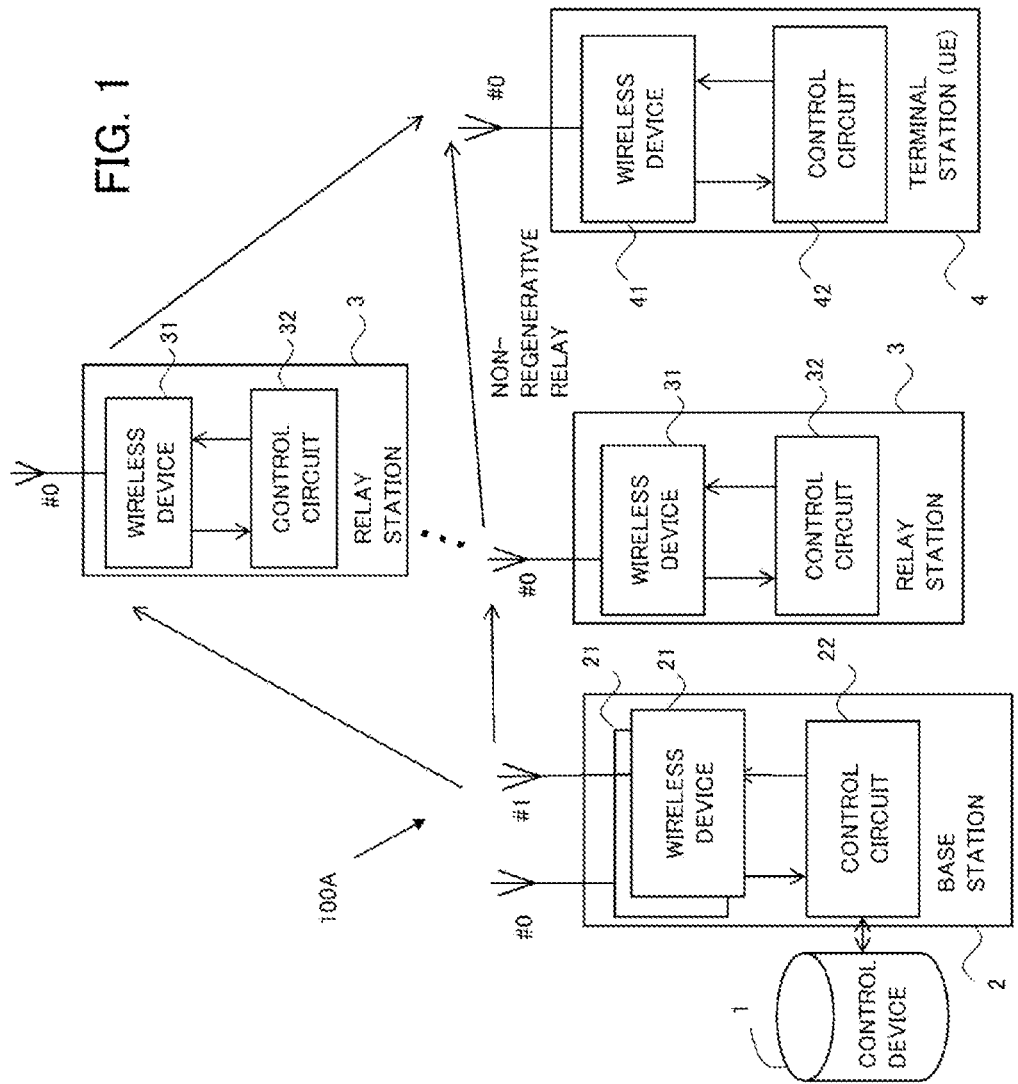
FIG. 1 is a diagram illustrating a first configuration example of a communication system according to a first embodiment.

In cellular networks such as the Third Generation Partnership Project (3GPP (registered trademark)), wireless LAN networks (IEE 802.11 series) such as Wi-Fi, or the like, a base station (BS) provides "the transmission diversity (Tx diversity)". The transmission diversity is a function in which the base station uses a plurality of transmission antennas to transmit a signal (called a downlink signal) from the base station to a terminal station. According to the transmission diversity, even when the terminal station has only one antenna, the terminal station can obtain a diversity effect (diversity gain) and improve a signal-to-interference ratio (SIR) and a signal to interference and noise power ratio (SINR).

For example, in a 5G communication system, it is conceivable that a relay station transmit a radio signal from a base station to which the transmission diversity has been applied to a terminal station through non-regenerative relay. In such a case, when a correlation between propagation characteristics of a radio signal received from the relay station by a reception station and propagation characteristics of a radio signal received from the base station is high, there is concern that it will not be possible to obtain a sufficient diversity effect in the terminal station.

In the present disclosure, when each of a plurality of relay stations uses one or two or more antennas to relay a radio signal from a transmission station to a reception station through non-regenerative relay, a different delay amount is set in an FIR filter corresponding to an antenna included in each relay station. Accordingly, a radio signal transmitted from each relay station through non-regenerative relay is caused to have a different delay between the relay stations or between the relay station and the antenna. This makes it possible to realize delay diversity for radio signals transmitted from a plurality of antennas included in a plurality of base stations, and obtain a suitable diversity effect in the reception station. When transmission diversity is applied to the radio signal from the transmission station, it is possible to improve the diversity gain in the terminal station by using the radio signals from the plurality of relay stations. However, a configuration of the relay station, which will be described below, can be applied to a radio signal from a base station (transmission station) to which the transmission diversity is not applied (for example, when the base station transmits a radio signal to a terminal station having one antenna using one antenna). In the present disclosure, the "reception station having one antenna" includes not only a terminal station having one antenna but also a terminal station having two or more antennas but using only one antenna for reception of a radio signal from the transmission station and the relay station. Further, a "relay station with one or two or more antennas" includes a relay station with only one antenna, a relay station with two or more antennas but using only one antenna for non-regenerative relay, and a relay station with two or more antennas and using two or more antennas for non-regenerative relay.

A communication system according to the present disclosure can include a transmission station, a reception station, a plurality of relay stations, and a control device. The transmission station is, for example, a base station, and the reception station is, for example, a terminal station. However, the transmission station may be the terminal station and the reception station may be the base station. The relay stations are, for example, small base stations, mobile base stations, smartphones, or in-vehicle devices. Start timings of respective slots constituting a radio frame are synchronized between the transmission station, the reception station, and the one or more relay stations.

The relay station performs the non-regenerative relay of a radio signal. In the non-regenerative relay, a radio signal (a first radio signal) received from a transmission station is converted into a baseband signal, but the baseband signal is not demodulated or decoded. The baseband signal is manipulated, and the manipulated baseband signal is converted to a radio signal and transmitted from an antenna. The relay station according to the present disclosure includes one or two or more antennas and a wireless device (radio) for each antenna, and the non-regenerative relay of the radio signal described above is executed for each antenna that receives a first radio signal. In the present disclosure, each finite impulse response (FIR) filter included in the wireless device assigns delays different between the relay stations or between the relay station and the antenna to respective baseband signals as an operation with respect to the baseband signal corresponding to each antenna. It is possible to assign delay diversity applied to a radio signal (a second radio signal) transmitted from a plurality of antennas included in the plurality of relay stations to the reception station by assigning a delay.

The relay station includes a controller (control unit), and the controller calculates a delay amount to be set in the FIR filter included in the wireless device of the relay station. For example, the controller can use a first propagation delay which is a propagation delay of a signal received from the reception station by the relay station, a second propagation delay which is a propagation delay of a signal received from the transmission station by the relay station, and a signal processing delay in the relay station to obtain a maximum delay, and calculate the delay amount to be set in the FIR filter within a range in which the maximum delay is not exceeded. This makes it possible for the FIR filter to assign a desired delay different among the antennas to the baseband signal.

The controller is, for example, a computer, a processor such as a central processing unit (CPU), an arithmetic circuit (integrated circuit) such as a field programmable gate array (FPGA), or a combination thereof. The control device included in the communication system can be configured of the computer, the processor such as the CPU, the integrated circuit, or a combination thereof that has been described above. The control device can give an instruction to the relay station, and the relay station can receive the instruction from the control device and perform assignment of the delay described above. It is also conceivable that the control device calculate the delay amount to be set in the FIR filter of each relay station described above and include the delay amount in the instruction, and the controller set the delay amount included in the instruction in each FIR filter.

The FIR filter according to the present disclosure may perform filtering for curbing (suppressing) interference between a radio signal received from the transmission station and a radio signal transmitted to the reception station (between a transmitter and a receiver), which occurs in the relay station. The interference between the signal received from the transmission station and the signal to be transmitted to the reception station is also called self-interference (SI). The controller can set a weight for curbing the self-interference for the FIR filter.

Further, aspects of the present disclosure can also be specified as a program for causing the relay station to execute the transmission method for a relay station, and a computer-readable non-transitory storage medium having the program recorded thereon, in addition to the relay station, the transmission method for a relay station, and the communication system including the relay station described above.

Hereinafter, embodiments of the present disclosure will be described on the basis of the drawings. Configurations of the following embodiments are examples, and the present disclosure is not limited to the configurations of the embodiments. In the embodiment, a 5G communication system is illustrated as a communication system, but configurations of the transmission station, the relay station, and the reception station according to the present disclosure can be applied to communication systems (a wireless LAN, or the like) other than 5G.

First Embodiment

FIG. 1 is a diagram illustrating a first configuration example of a communication system according to the first embodiment. In FIG. 1, a communication system 100A according to the first configuration example includes a control device (control device) 1, a base station 2, a plurality of relay stations 3-1, . . . , 3-N(N is an integer indicating the number of relay stations), and a terminal station 4. In the following description, the relay stations 3-1, . . . , 3-N are described as a "relay station 3" when the relay stations 3-1, . . . , 3-N are not distinguished from each other. Further, in the communication system 100A, the number of terminal stations 4 may be singular or plural (one terminal station 4 is illustrated in FIG. 1).

The control device 1 is a device on a core network to which the base station 2 is connected. However, it is also conceivable that the control device 1 is the core network itself or a system included in the core network. The core network includes, for example, an optical fiber network. The control device 1 controls the base station 2, the relay station 3, and the terminal station 4, and provides the terminal station 4 with a communication service.

The base station 2 provides the terminal station 4 with a wireless access network. An area in which radio communication is possible in the wireless access network is also called a cell. The base station 2 includes one or more antennas (for example, antennas #0 and #1), a wireless device 21 corresponding to each antenna, and a control circuit 22 in the first embodiment. The control circuit 22 includes, for example, a processor and a memory. The processor controls communication with the control device 1 (the base station 2) and wireless communication with the relay station 3 and the terminal station 4 according to a computer program in the memory.

The relay station 3 relays wireless communication between the base station 2 and the terminal station 4. The relay station 3 is, for example, a small base station, a mobile base station, an in-vehicle device, or a smart phone. The relay station 3 can be selected as a relay station by the control device 1 from among devices having a configuration capable of the non-regenerative relay. When a connection request is generated from the terminal station 4, the control device 1 can select one or more relay stations 3 located within a range of the cell provided by the base station 2, and transmit an instruction to perform the non-regenerative relay of wireless communication to each relay station 3. The relay station 3 that has received the instruction operates as the relay station 3 selected by the control device 1.

The relay station 3 includes at least one (one or more) antenna, a wireless device 31 corresponding to each antenna, and a control circuit 32 (an example of a "controller"), like the base station 2. In the example illustrated in FIG. 1, each of the relay stations 3-1 to 3-N has one antenna (#0).

The terminal station 4 is, for example, a mobile station such as a smart phone, a tablet terminal, a wearable terminal, or an in-vehicle data communication device. However, the terminal station 4 is not limited thereto, and may be a stationary terminal device. For example, the terminal device connects to the wireless access network within the range of the cell provided by the base station 2.

The terminal station 4 includes one antenna (for example, #0), a wireless device 41 connected to the antenna, and a control circuit 42. For example, the mobile station in the cell requests the base station 2 to connect the mobile station to the wireless access network, and is connected to the wireless access network, so that the mobile station operates as the terminal station 4. A mobile station within the cell may directly request the base station 2 to connect the mobile station to the wireless access network. Alternatively, the mobile station within the cell may request the base station 2 to connect the mobile station to the wireless access network via a device operating as a relay station 3 within the cell. The terminal station 4 can be said to be a station capable of communicating with the base station 2 via any of one or more relay stations 3 or not via any of the one or more relay stations 3.

Figure 2:
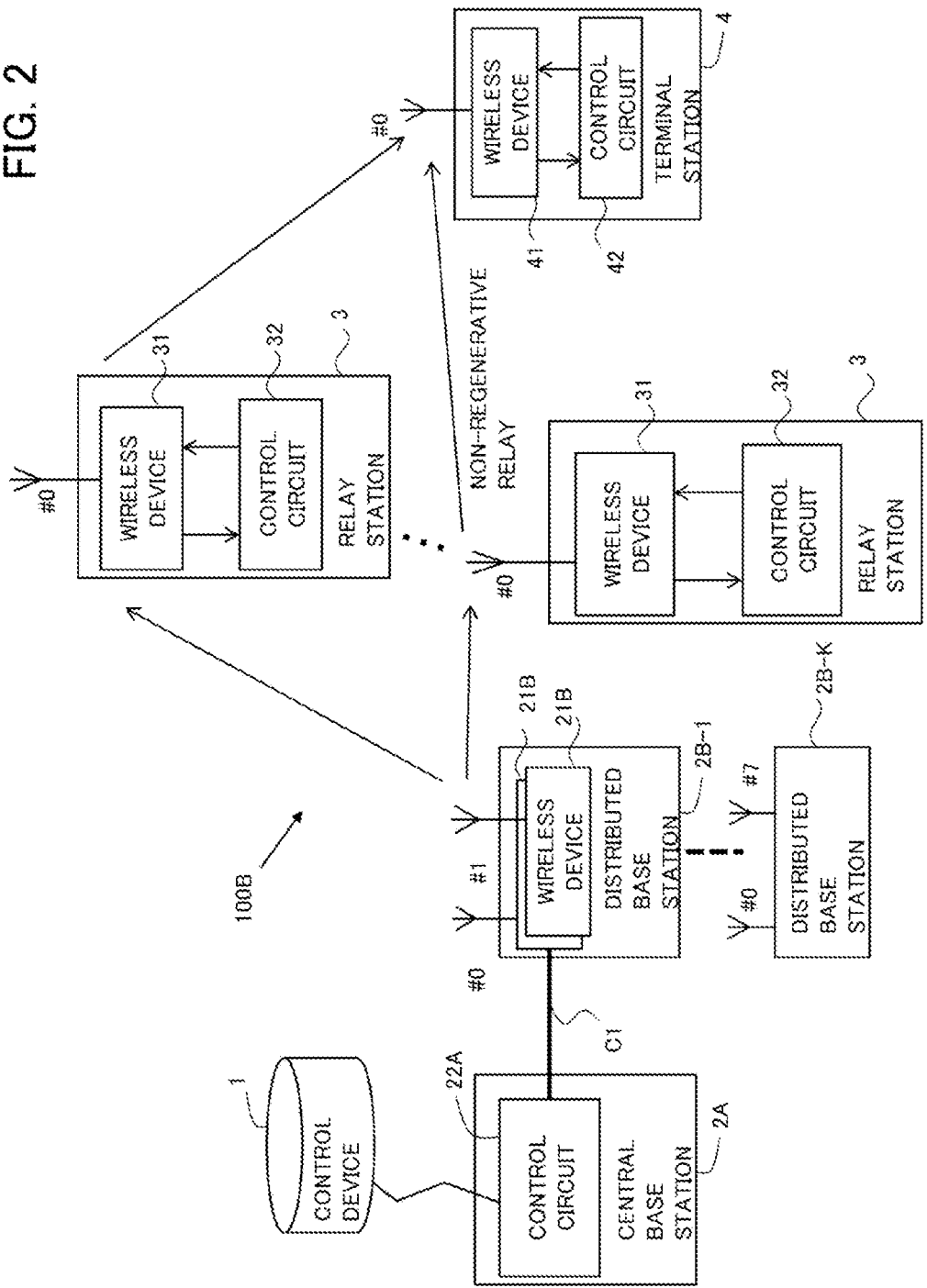
FIG. 2 is a diagram illustrating a second configuration example of the communication system according to a second embodiment.

FIG. 2 is a diagram illustrating a second configuration example of the communication system according to the first embodiment. As the communication system, a communication system 100B according to the second configuration example as illustrated in FIG. 2 may be applied. The communication system 100B differs from the communication system 100A of FIG. 1 in the following points. That is, the communication system 100B includes a central base station 2A and one or more distributed base stations 2B in place of the base station 2. When one or more distributed base stations 2B are distinguished individually, the distributed base stations 2B are given branch numbers, like distributed base stations 2B-1, ... 2B-K. Here, branch number K is an integer indicating the number of distributed base stations. In FIG. 2, the distributed base stations 2B-1 and 2B-K are illustrated. However, when the distributed base stations 2B-1, ... 2B-K are collectively referred to, the distributed base stations 2B-1, ... 2B-K are simply described as distributed base stations 2B.

The central base station 2A includes a control circuit 22A. Further, the distributed base station 2B includes a wireless device 21B corresponding to antennas #0 and #1. The control circuit 22A of the central base station 2A and the wireless device 21B of the distributed base station 2B are connected by, for example, an optical fiber Cl or a wireless network. A topology of the optical fiber Cl connecting the central base station 2A and the plurality of distributed base stations 2B is not limited to a specific topology. For example, the topology of the optical fiber Cl may be a one-to-one connection between nodes, a network branching as a distance from the central base station 2A increases, a star network, a ring network, or the like. Further, when the control circuit 22A of the central base station 2A and the wireless device 21B of the distributed base station 2B are connected by the wireless network, a standard and protocol of the adopted wireless network are not limited to specific ones.

The control circuit 22A includes a processor and a memory, like the control circuit 22 of FIG. 1. The processor controls communication with the control device 1 and wireless communication with the relay station 3 and the terminal station 4 according to the computer program stored in the memory. That is, the control circuit 22A controls wireless communication with the relay station 3 and the terminal station 4 via the wireless device 21B of the one or more distributed base stations 2B. Since configurations of the relay station 3 and the terminal station 4 are the same as those of the communication system 100A, repeated description thereof will be omitted.

The following configuration is adopted as a premise for the communication systems 100A and 100B. In the communication systems 100A and 100B, communication according to time division multiplexing is performed, and the same frequency channel is used for uplink and downlink. In addition, start timings of slots each constituting a radio frame are synchronized between the base station 2, the relay station 3, and the terminal station 4.

In the communication systems 100A and 100B, a block transmission scheme with a cyclic prefix (CP) such as Cyclic Prefix-Orthogonal Frequency Division Multiplexing (CP-OFDM) is adopted as a radio modulation scheme. Although a case in which CP-OFDM is applied will be described in the present embodiment, a block transmission scheme with CP other than CP-OFDM may also be used. In addition, the relay station 3 shares resource block information that is used in the uplink and the downlink by the terminal station 4 that is a relay target.

The uplink is a link in a direction from the terminal station 4 to the base station 2. The downlink is a link in a direction from the base station 2 to the terminal station 4. The following description illustrates a case in which the non-regenerative relay is performed in a downlink direction. That is, for the transmission station, the base station 2 corresponds to the "transmission station" and the terminal station 4 corresponds to the "reception station". However, the non-regenerative relay performed by the relay station 3 in the embodiment may also be applied to communication in an uplink direction.

The relay station 3 assigns a delay to a relay signal, that is, a signal that is non-regeneratively relayed to the terminal station 4 (the second radio signal). The relay station 3 calculates a timing at which the relay signal is caused to arrive at the terminal station 4. The relay station 3 calculates a delay time to be assigned, on the basis of propagation characteristics of radio waves between the base station 2 and the relay station 3, propagation characteristics of radio waves between the relay station 3 and the terminal station 4, and signal processing time in the relay station 3 so that the relay signal transmitted from each antenna (antennas #0 and #1) reaches the terminal station 4 at a desired timing. The propagation characteristics of radio waves include, for example, propagation delay, spread of delay, and amount of phase rotation. However, information included in the propagation characteristics of radio waves is not limited thereto. The propagation delay is a time taken for a signal to reach a reception side device after the signal is transmitted from a transmission side device. The spread of the delay is a time taken for reception of a signal to be completed after the signal starts to reach the reception side device.

Figure 3:
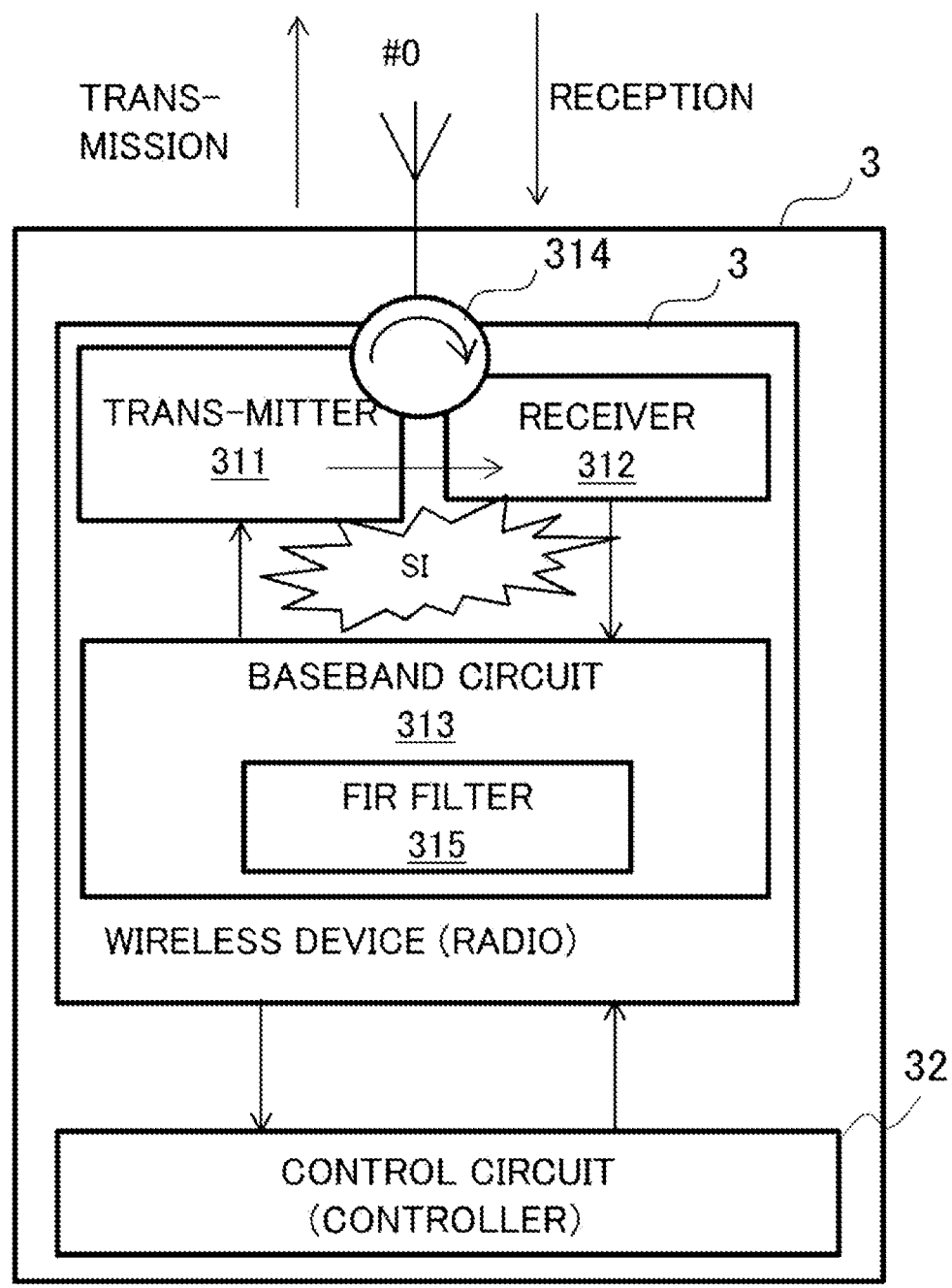
FIG. 3 is a diagram illustrating a hardware configuration example of a relay station.

FIG. 3 is a diagram illustrating an example of a hardware configuration of the relay station 3. The relay station 3 includes a wireless device 31 and a control circuit 32. The wireless device 31 of the relay station 3 includes a transmitter 311, a receiver 312, and a baseband circuit 313. The transmitter 311 and the receiver 312 are connected to the antenna (#0) via a circulator 314. That is, the transmitter 311, the receiver 312, and the antenna (#0) are connected to three ports of the circulator 314. A transmission signal from the transmitter 311 is input to, for example, a first port of the circulator 314 and transferred to the receiver 312 from a second port. A transmission signal from the transmitter 311 is input to a third port of the circulator 314 and transferred from the first port to the antenna (#0).

Here, a power difference between the transmission signal and the reception signal is, for example, about 100 dB. On the other hand, isolation of the circulator 314 is on the order of 30 dB, and a part of the transmission signal interferes with the reception signal. Interference between the part of the transmission signal and the reception signal in the wireless device 31 is called self-interference. The self-interference is curbed by use of both of a radio frequency (RF) analog filter in the receiver 312 and an FIR filter 315 in the baseband circuit 313.

The receiver 312 receives a reception signal (for example, a radio signal from the base station 2) from the antenna (#0) via the circulator 314. The receiver 312 includes a quadrature detection circuit and an analog-to-digital (AD) converter. The receiver 312 down-converts the reception signal through quadrature detection, and converts the signal into digital data using the AD converter to obtain a baseband signal. The receiver 312 outputs the obtained baseband signal to the baseband circuit 313.

The baseband circuit 313 is a digital circuit including the FIR filter 315. The baseband signal as a reception signal is input to the FIR filter 315. The FIR filter 315 curbs a self-interfering transmission signal mixed in the baseband signal and delays the baseband signal by a predetermined delay time. The baseband circuit 313 inputs an output signal of the FIR filter 315 (a signal filtered by the FIR filter 315) to the transmitter 311.

The transmitter 311 includes a digital-to-analog (DA) converter and a modulation circuit. The transmitter 311 converts the reception signal from the baseband circuit 313 into an analog signal to generate an RF signal using the modulation circuit. The transmitter 311 transmits the RF signal as a relay signal from the antenna (#0) via the circulator 314.

The control circuit 32 can be configured of, for example, a processor such as a CPU, an integrated circuit such as an FPGA, or a combination thereof. The control circuit 32 controls non-regenerative relay processing. More specifically, the control circuit 32 can measure propagation characteristics of the propagation path, and notifies the control device 1 of measurement results or sets the delay time (corresponding to the delay amount) for the FIR filter 315. Further, the control circuit 32 can calculate a weight for curbing the self-interference and set the weight in the FIR filter 315. The control circuit 32 is an example of a "controller (control unit)" of the "relay station".

Figure 4:
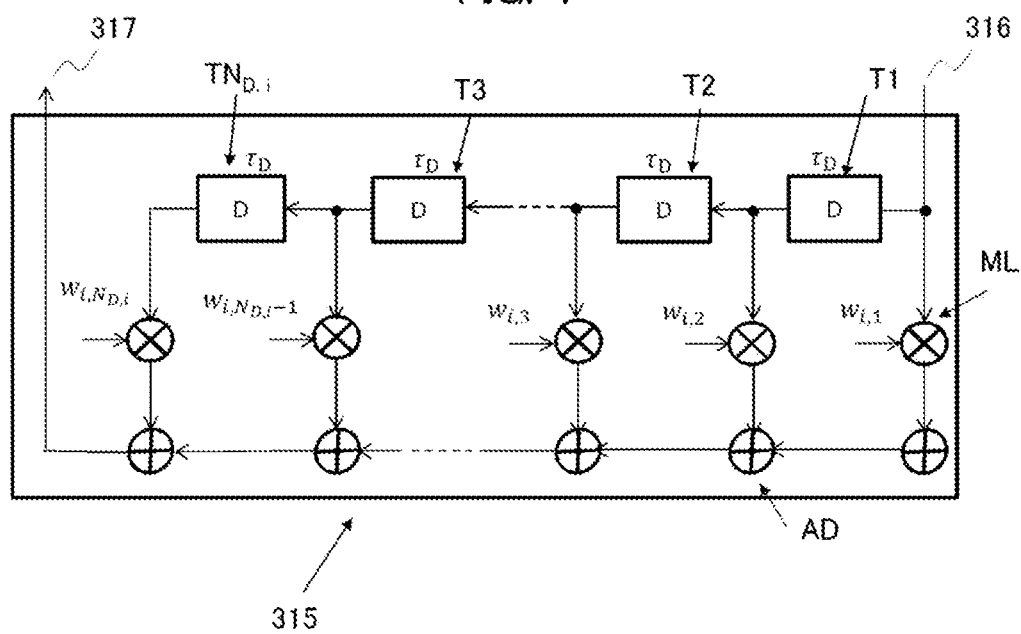
FIG. 4 is a diagram illustrating a configuration example of an FIR filter.

FIG. 4 is a diagram illustrating a configuration example of the FIR filter 315. The FIR filter 315 includes an input terminal 316, an output terminal 317, and $N\_(D,i)$ stages of taps $(T1, T2, \ldots, TN\_(D,i))$. Characters in parentheses following an underline after a letter correspond to subscripts in the figure. Each of the taps other than the tap T1 includes a delay device (delay element) D that delays an input signal by a delay time $\tau\_(D)$, and a multiplier ML that multiplies a complex weight.

The tap T1 does not have the delay device D, and weights the input signal from the input terminal 316 with a weight $w\_(i,1)$ using the multiplier ML. The tap T2 delays the input signal with the delay device D (delay time $\tau\_(D)$) and weights the signal with weight $w\_(i,2)$ with the multiplier ML. The same applies to the tap T3 and subsequent taps. Therefore, at the tap $TN\_(D,i)$ at the last stage, a delay time $\tau\_(D) \times (N\_(D,i)-1)$ is assigned to the input signal to the tap T1 (the input signal to the FIR filter 315), and a weight $w\_(i, N\_(D,i))$ is weighted. Signals processed by the respective taps $(T1, T2, \ldots, TN\_(D,k))$ are added by an adder AD and output from an output terminal 317. With the above configuration, the input signal to the FIR filter 315 is subjected to weighted average, an interference signal and noise other than the reception signal are removed, and only the delay time $\tau\_(D) \times (N\_(D,i)-1)$ is delayed.

The number of taps $N\_(D,i)$ used by the FIR filter 315 and the weight $w\_(i)$, that is, $w\_(i, 1,)$ to $w\_(i, N\_(D,i)$ are calculated by the control circuit 32. Details will be described below.

Figure 5:
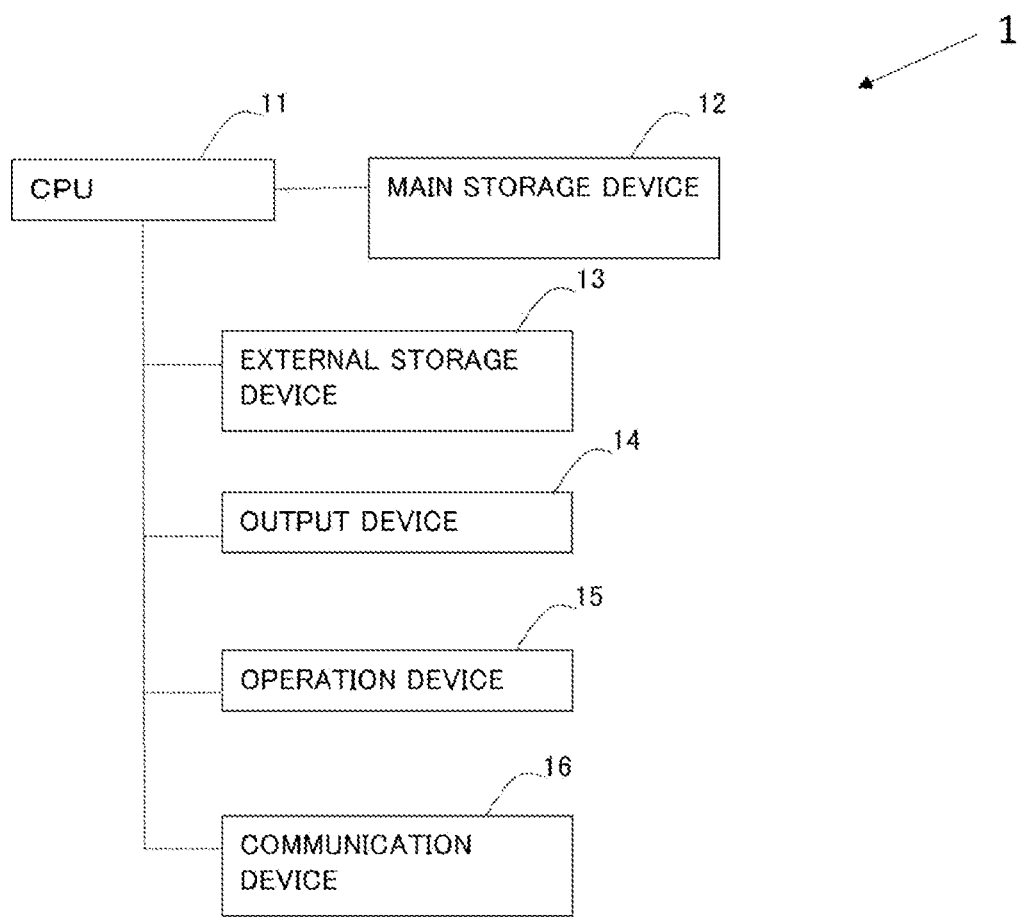
FIG. 5 is a diagram illustrating a hardware configuration of a control device.

FIG. 5 is a diagram illustrating a hardware configuration of the control device 1. The control device 1 includes a CPU 11, a main storage device 12, and an external device, and executes communication processing and information processing according to computer program. The CPU 11 is also called a processor. The CPU 11 is not limited to a single processor, and may have a multiprocessor configuration. Further, the CPU 11 may include a graphics processing unit (GPU), a digital signal processor (DSP), and the like.

Further, the CPU 11 may cooperate with a hardware circuit such as a field programmable gate array (FPGA). An external storage device 13, an output device 14, an operation device 15, and a communication device 16 are illustrated as external devices.

The CPU 11 executes the computer program developed in the main storage device 12 and provides processing of the control device 1. The main storage device 12 stores computer programs executed by the CPU 11, data processed by the CPU 11, and the like. The main storage device 12 is a dynamic random access memory (DRAM), a static random access memory (SRAM), a read only memory (ROM), or the like. Further, the external storage device 13 is used, for example, as a storage area that assists the main storage device 12, and stores computer programs executed by the CPU 11, data processed by the CPU 11, and the like. The external storage device 13 is a hard disk drive, a solid state drive (SSD), or the like. Further, a drive device of a removable storage medium may be connected to the control device 1. The removable storage medium is, for example, a Blu-ray disc, a digital versatile disc (DVD), a compact disc (CD), or a flash memory card.

The output device 14 is, for example, a display device such as a liquid crystal display or an electroluminescence panel. However, the output device 14 may include a speaker or other device that outputs sound. The operation device 15 is, for example, a touch panel in which a touch sensor is superimposed on a display. The communication device 16, for example, communicates with the base station 2 and an external network such as the Internet via an optical fiber. The communication device 16 is, for example, a gateway that communicates with a gateway connected to the base station 2 and the external network such as the Internet. The communication device 16 may be one device or may be a combination of a plurality of devices. A hardware configuration of the control device 1 is not limited to configuration illustrated in FIG. 5. Further, the control circuit 32 of the relay station 3 described above may be configured as a device including the CPU 11, the main storage device 12, and the external storage device 13 described above.

Figure 6:
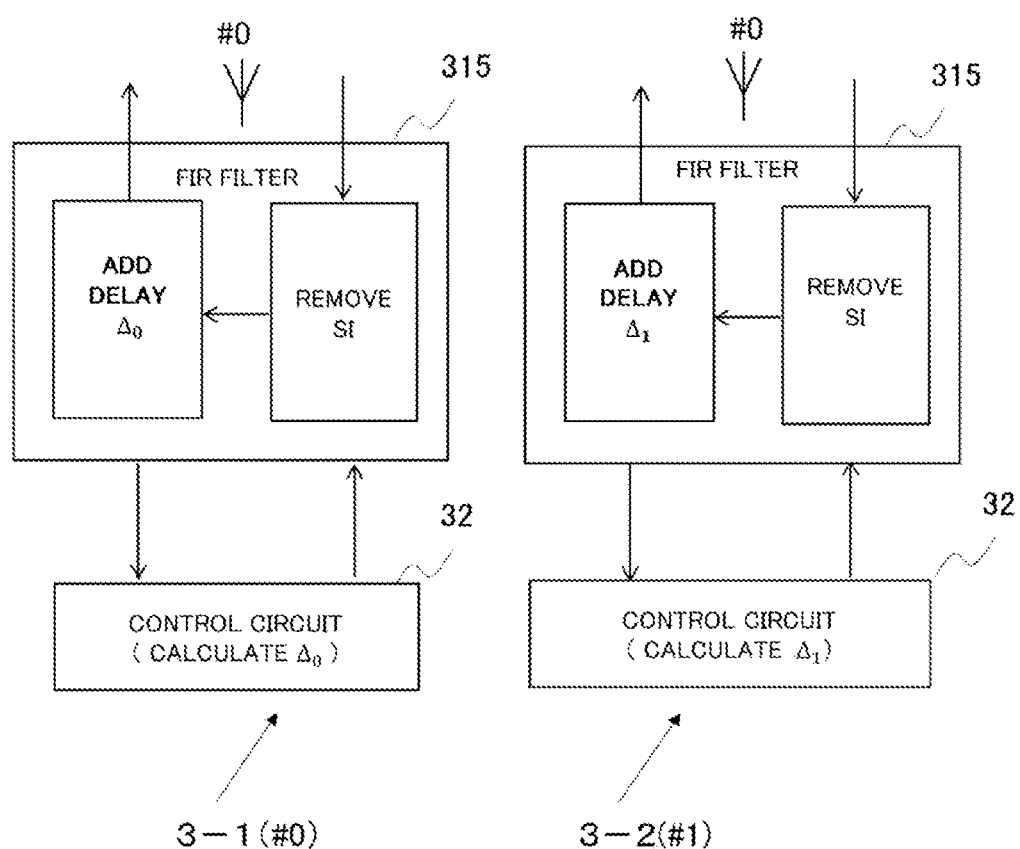
FIG. 6 is an illustrative diagram of processing in the relay station.
Figure 7:
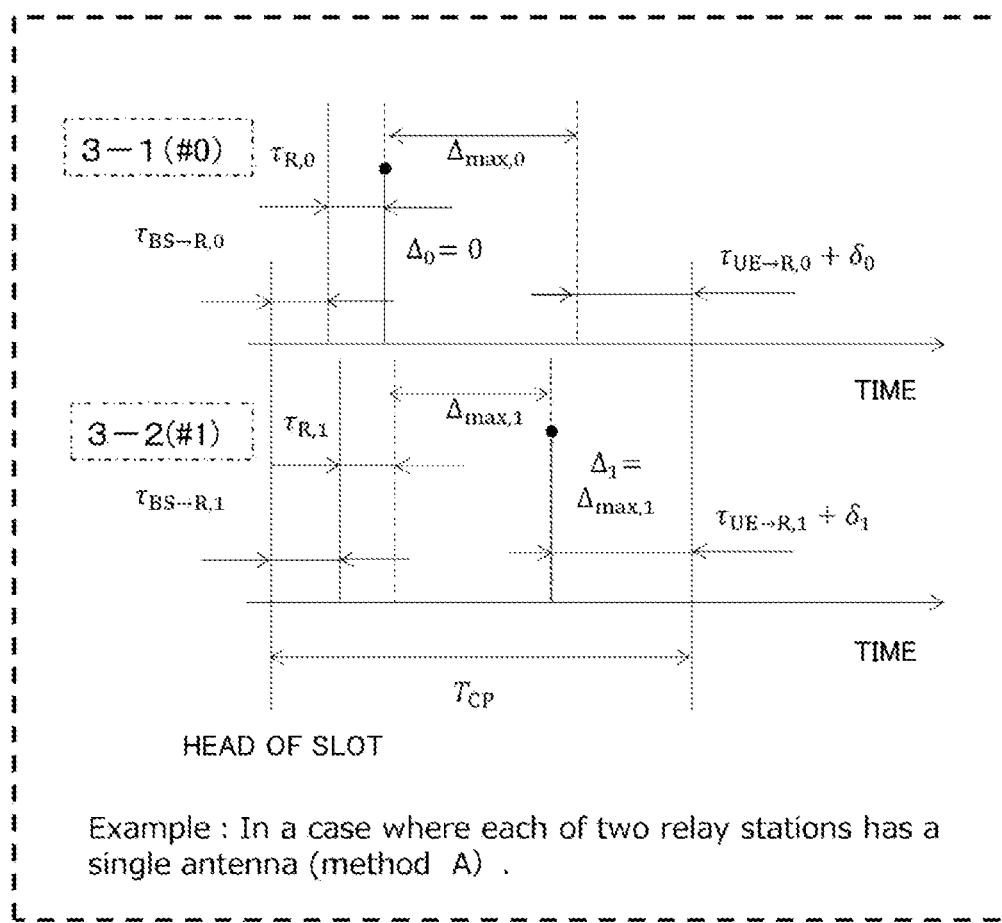
FIG. 7 is an illustrative diagram of processing in the relay station.

FIGS. 6 and 7 are illustrative diagrams of processing in the relay station 3. In FIG. 6, a relay station 3-1 (relay station #0) and a relay station 3-2 (relay station #1 when the number of stations is N and N=2) are shown as examples of two or more relay stations 3 (the relay station #i, where i is a number for specifying the relay station). Each of the relay stations 3-1 and 3-2 has the configuration illustrated in FIG. 3, which is simplified in FIG. 6.

In the relay station 3-1, the control circuit 32 calculates the delay time $\Delta\_(0)$ assigned to the antenna #0 of the relay station 3-1. The FIR filter 315 included in the relay station 3-1 performs processing of each of removal of the self-interference (SI) and assignment of the delay time $\Delta\_(0)$ on a baseband signal obtained by conversion of a radio signal (first radio signal) received by the antenna #0 of the relay station 3-1 and outputs a processed signal. An output signal of the FIR filter 315 is converted into a radio signal (second radio signal) and radiated from the antenna #0 of the relay station 3-1.

In the relay station 3-2, the control circuit 32 calculates the delay time $\Delta\_(1)$ assigned to the antenna #0 included in the relay station 3-2. The delay time $\Delta\_(1)$ has a different value from the delay time $\Delta\_(0)$. The FIR filter 315 included in the relay station 3-2 performs processing of each of removal of the self-interference (SI) and assignment of the delay time $\Delta\_(1)$ on a baseband signal obtained by conversion of a radio signal (first radio signal) received by the antenna #0 of the relay station 3-2 and outputs a processed signal. The output signal of the FIR filter 315 is converted into a radio signal (second radio signal) and radiated from the antenna #0 of the relay station 3-2.

FIG. 7 illustrates a case in which the number of relay stations 3 is two (the relay station 3-1 and the relay station 3-2), and each of the relay stations 3-1 and 3-2 has one antenna. Each of the relay stations 3-1 and 3-2 communicates with the base station 2 and the terminal station 4 using CP-OFDM. The calculation of the delay times $\Delta\_(0)$ and $\Delta\_(1)$ performed by the relay stations 3-1 and 3-2 is performed for each radio frame or for each slot constituting the radio frame.

In CP-OFDM, radio signals reaching the reception station between a beginning of the slot and the lapse of a cyclic prefix (CP) time, that is, a time length of CP (CP length=5 μsec) are normally combined to contribute to improvement of the diversity gain. Therefore, in FIG. 7, the CP length (CP time) is shown as allowable delay $T\_(CP)$.

"$\tau\_(BS \rightarrow R,0)$" illustrated in FIG. 7 indicates a propagation delay in a propagation path of the radio signal from the base station 2 (BS) to the relay station 3-1 (relay station #0). "$\tau\_(BS \rightarrow R,1)$" indicates a propagation delay in the radio signal propagation path from the base station 2 (BS) to the relay station 3-2 (relay station #1). A propagation delay $\tau\_(BS \rightarrow R,i)$ can be measured (calculated) from, for example, a reference signal such as a control channel to be transmitted from the base station 2 (BS) to the terminal station 4 (UE), which is received by the relay station #i (each of the relay stations 3-1 and 3-2).

Further, "$\tau\_(R,0)$" illustrated in FIG. 7 is a processing delay in the relay station 3-1(relay station #0), and "$\tau\_(R,1)$" is a processing delay in the relay station 3-2 (relay station #1). A value of $\tau\_(R,i)$ can be calculated, for example, by using a calculation equation "the number of delay elements of the FIR filter 315 ($N\_(D,i)-1$)×delay time $\tau\_(D)$ per delay element".

Further, "$\tau\_(UE \rightarrow R,0)$" illustrated in FIG. 7 indicates a propagation delay in the radio signal propagation path from the terminal station 4 (UE) to the relay station 3-1 (relay station #0). "$\tau\_(UE \rightarrow R,1)$" indicates a propagation delay in the radio signal propagation path from the terminal station 4 (UE) to the relay station 3-2 (relay station #1). A propagation delay $\tau\_(UE \rightarrow R,i)$ can be measured (calculated) from, for example, a reference signal such as a control channel to be transmitted from the terminal station 4 (UE) to the base station 2 (BS), which is received in the relay station #i (each of the relay stations 3-1 and 3-2).

Further, "$\delta\_(0)$" illustrated in FIG. 7 is a value indicating a measurement deviation and delay spread in the relay station 3-1(relay station #0). "$\delta\_(1)$" is a value indicating the measurement deviation and the delay spread at the relay station 3-2 (the relay station #1). A value of $\delta\_(i)$ can be calculated through reception of a reference signal between the relay station #i and the terminal station 4 (UE) and reception of a reference signal from the terminal station 4 (UE) to the base station 2 (BS) when the value of $\delta\_(i)$ is calculated for the downlink.

Further, "$\Delta\_(max,0)$" illustrated in FIG. 7 indicates a maximum value (maximum delay) of the delay time that can be assigned to a baseband signal input to the FIR filter 315 between allowable delays $T\_(CP)$ in the relay station 3-1 (relay station #0). "$\Delta\_(max,1)$" is a maximum value (maximum delay) of the delay time that can be assigned to a baseband signal input to the FIR filter 315 between allowable delays $T\_(CP)$ in the relay station 3-2 (relay station #1). The maximum delay $\Delta\_(max,i)$ can be calculated by, for example, a calculation equation "$\Delta\_(max,i)=T\_(CP)-(\tau\_(UE \rightarrow R,i)+\tau\_(R,i)+\tau\_(BS \rightarrow R,i)+5 (i))$".

The propagation delay $\tau\_(BS \rightarrow R,i)$, the processing delay $\tau\_(R,i)$, the propagation delay $\tau\_(UE \rightarrow R,i)$, $\delta\_(i)$, and the maximum delay $\Delta\_(max,i)$ can be measured and calculated by the control circuit 32 of the relay station #i. However, the measurement and calculation may be performed by a circuit outside the control circuit 32.

The control circuit 32 calculates delay times $\Delta\_(i)$ different between the relay station 3-1(#0) and the relay station 3-2(#1) so that an inequality "$\Delta\_(i) \leq \Delta\_(max,i)$" is satisfied, and sets $\Delta\_(i)$ in the FIR filter 315. However, the delay time $\Delta\_(i)$ is set in the FIR filter 315 in a state in which the delay time $\Delta\_(i)$ is discretized by the delay time ($\tau\_(D)$) per tap of the FIR filter 315.

For example, the control circuit 32 can calculate the delay time $\Delta\_(i)$ by using a calculation equation "$\Delta\_(i)=i \cdot \Delta(max,i)/(N\_(R)-1)$" on the basis of a number of relay stations $N\_(R)$, which is the number of relay stations #i. In this case, when the number of relay stations $N\_(R)=2$, the delay time $\Delta\_(0)$ becomes 0 and the delay time $\Delta\_(1)$ becomes $\Delta\_(max,1)$, as illustrated in FIG. 7. That is, a transmission timing of the radio signal (second radio signal) from the relay station 3-1(#0) is immediately after a processing delay $\tau\_(R)$ ends, and a transmission timing of a radio signal (second radio signal) from the relay station 3-2(#1) becomes a timing at which a period of $\Delta\_(max,1)$ ends in the relay station 3-2(#1). Accordingly, the second radio signals transmitted from the relay stations 3-1 and 3-2(#0 and #1) reach the terminal station 4 before $T\_(CP)$, that is, the CP time expires.

Figure 8:
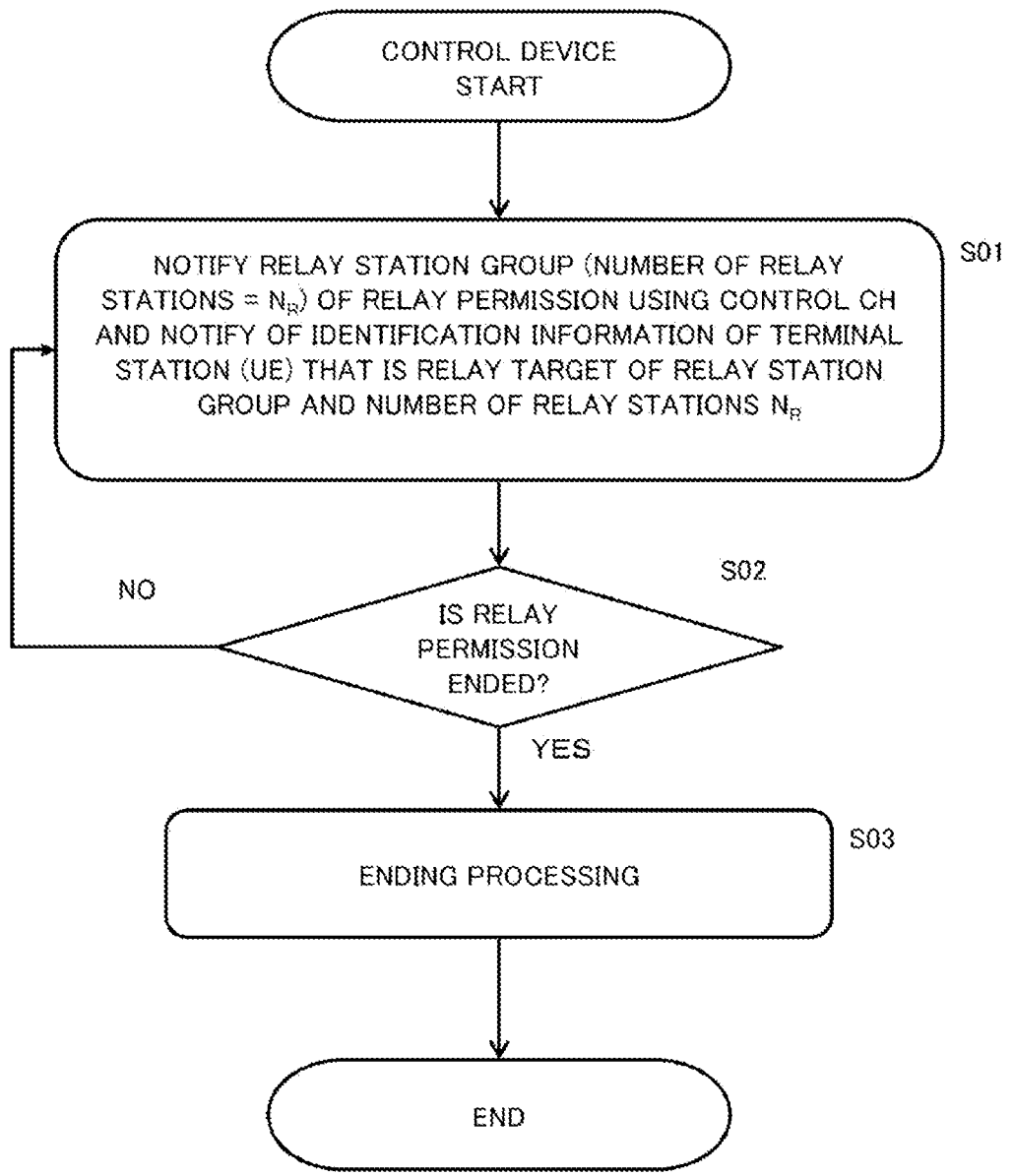
FIG. 8 is a flowchart illustrating an example of processing of the control device.

FIG. 8 is a flowchart illustrating an example of processing of the control device 1. The processing illustrated in FIG. 8 is performed by the CPU 11 of the control device 1, for example. Step S01 is performed, for example, when the base station 2 (transmission station) starts transmission of a radio signal to the terminal station 4 (reception station) using the downlink. In step S01, the control device 1 selects a plurality of relay stations 3 (relay stations #i) to be caused to perform non-regenerative relay, that is, the relay station group (the number of relay stations=$N\_(R)$), for communication between the base station 2 and the terminal station 4. The control device 1 notifies the relay station group of relay permission via the control channel (transmits a message including a relay permission instruction). The control device 1 also notifies (transmits) identification information of the terminal station 4 (UE) that is a relay target of each relay station 3 included in the relay station group. The base station 2 can transmit a radio signal to which transmission diversity using a plurality of antennas (for example, the antennas #0 and #1) has been applied, in communication with the terminal station 4. However, the base station 2 may transmit a radio signal to which transmission diversity is not applied, using a single antenna.

In step S02, the control device 1 determines whether or not a condition for ending the relay permission is satisfied. When a determination is made that the condition is satisfied, the processing returns to step S01 and otherwise, the processing proceeds to step S03.

In step S03, the control device 1 performs end processing. For example, the control device 1 stops notifying a relay station group of the relay permission. Alternatively, the control device 1 transmits an instruction to end the relay to the relay station group. Thereafter, the control device 1 ends the processing. Thus, the non-regenerative relay in the relay station group is performed on the basis of the instruction (the relay permission) from the control device 1.

Figure 9:
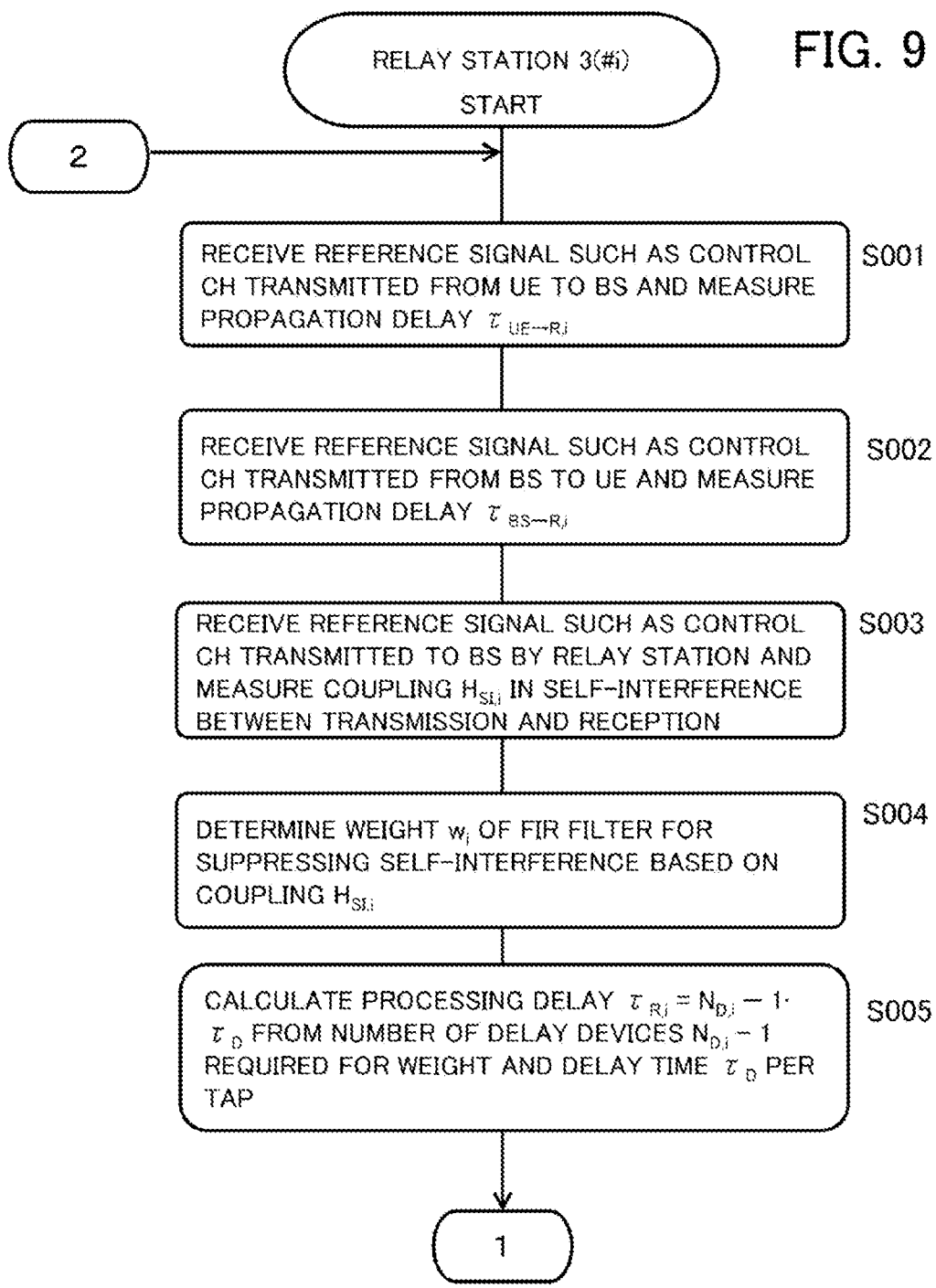
FIG. 9 is a flowchart illustrating an example of processing of the relay station.
Figure 10:
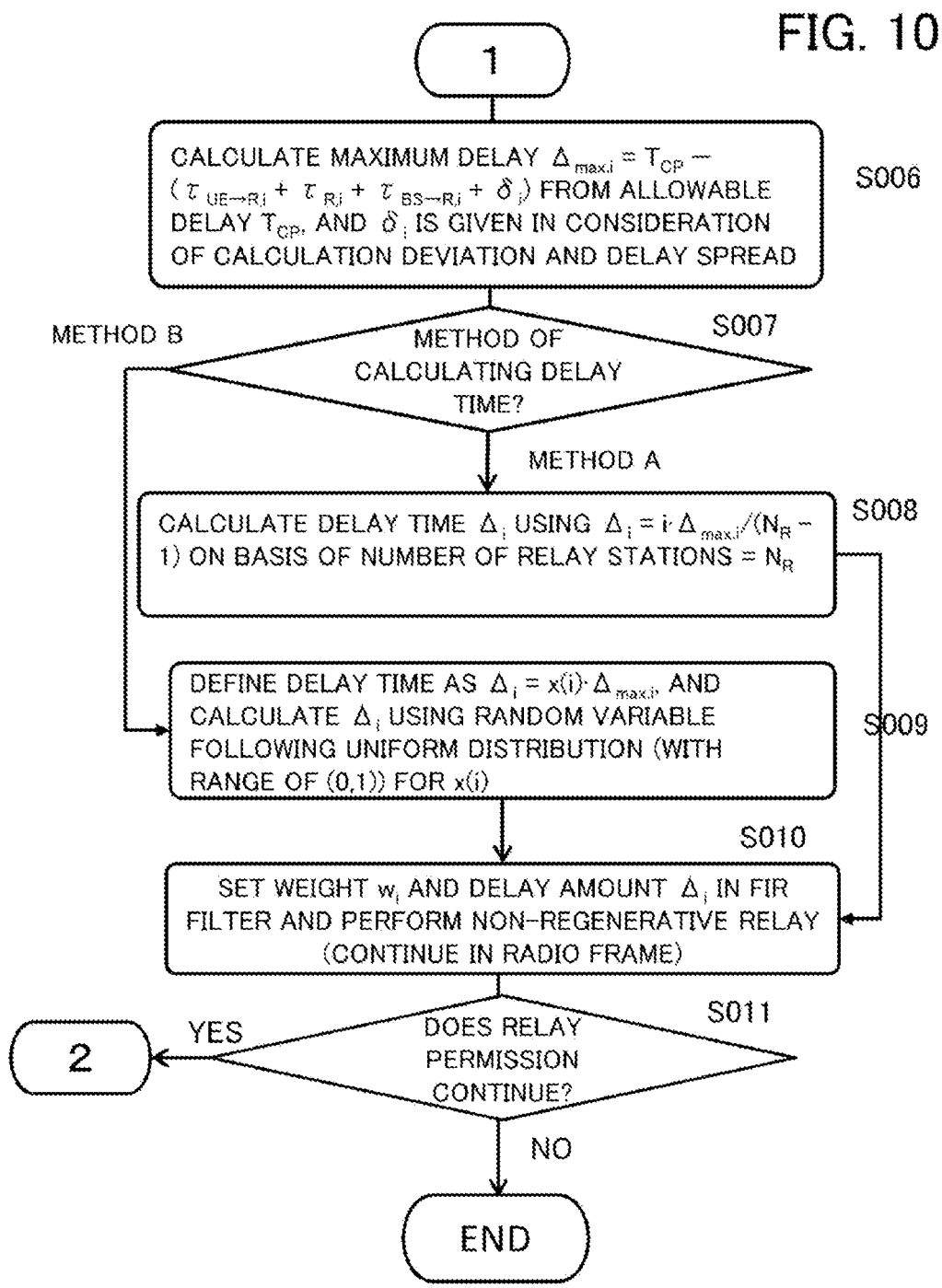
FIG. 10 is a flowchart illustrating an example of processing by the relay station.

FIGS. 9 and 10 are flowcharts illustrating examples of processing of each relay station 3 (the relay station #i) included in the relay station group. The processing illustrated in FIGS. 9 and 10 is executed by the control circuit 32 of each relay station 3, for example. Further, the processing illustrated in FIGS. 9 and 10 is started when an instruction (control signal) including the relay permission from the control device 1 is received.

In step S001, the control circuit 32 uses a reference signal such as a control channel (control CH) transmitted from the terminal station 4 (UE) to the base station 2 (BS), which is received by the relay station 3, to measure the propagation delay $\tau\_(UE \rightarrow R,i)$ of the radio signal transmission path from the terminal station 4 to the relay station 3. When there are a plurality (two or more) of target terminal stations 4, the control circuit 32 determines a value serving as the maximum propagation delay to be $\tau\_(UE \rightarrow R,i)$.

In step S002, the control circuit 32 uses a reference signal such as a control CH transmitted from the base station 2 to the terminal station 4, which is received by the relay station 3, to measure the propagation delay $\tau\_(BS \rightarrow R,i)$ of the radio signal propagation path from the base station 2 to the relay station 3.

In step S003, the control circuit 32 uses a reference signal such as a control CH transmitted to the base station 2 by the relay station 3, which is received by the relay station 3, to measure coupling $H\_(SI,i)$ in the self-interference (SI) between the transmitter and the receiver.

In step S004, the control circuit 32 determines (calculates) a weight $w\_(i)$ of the FIR filter 315 for curbing self-interference on the basis of the coupling $H\_(SI,i)$.

In step S005, the control circuit 32 calculates the processing delay $\tau\_(R,i)$ from the number of delay devices $N\_(D,i)-1$ required for the weight and the delay time $\tau\_(D)$ per tap. For example, the control circuit 32 calculates $\tau\_(R,i)$ using a calculation equation "$\tau\_(R,i)=(N\_(D,i)-1)\times\tau\_(D)$".

An order of processing from step S001 to step S005 is an example, and the order may be changed in any way.

In step S006, the control circuit 32 uses the allowable delay $T\_(CP)$, the propagation delay $\tau\_(UE \rightarrow R,i)$, the propagation delay $\tau\_(BS \rightarrow R,i)$, the processing delay $\tau\_(R,i)$, and $\delta\_(i)$ to calculate the maximum delay $\Delta\_(max,i)$.

In step S007, the control circuit 32 determines which of method A and method B is to be executed as a delay time calculation method. When the control circuit 32 determines that the method A is executed, the processing proceeds to step S008, and when the control circuit 32 determines that the method B is executed, the processing proceeds to step S009.

In step S008, the control circuit 32 calculates the delay time for the relay station #i (own relay station) using a calculation equation "$\Delta\_i=i\cdot\Delta\_(max,i)/(N\_(R)-1)$". Thereafter, the processing proceeds to step S010.

In step S009, the control circuit 32 calculates the delay time using a calculation equation "$\Delta\_(i)=x\_(i)\cdot\Delta\_(max,i)$". In this case, $x\_(i)$ is calculated by giving a random variable following a uniform distribution (with a range of (0, 1)).

In step S010, the non-regenerative relay is performed. That is, the control circuit 32 sets the weight $w\_(i)$ and the delay time $\Delta\_(i)$ in each FIR filter 315. In the wireless device 31 of the relay station #i, the receiver 312 converts the radio signal (the first radio signal) from the base station 2 (transmission station) received by the antenna #0 into a baseband signal and inputs the baseband signal to the FIR filter 315. The FIR filter 315 performs filtering based on the setting of the weight $w\_(i)$ and the delay times $\Delta\_(i)$. The output signal of the FIR filter 315 is input to the transmitter 311. The transmitter 311 converts the input signal into a radio signal (the second radio signal) directed to the terminal station 4. The second radio signal is radiated (transmitted) from the antenna #0. The processing is performed for each slot of the downlink of the radio frame. However, the processing can be performed on each slot of the uplink. The above-described processing is executed in each relay station 3 (for example, the relay stations 3-1 and 3-2) constituting the relay station group, so that the second radio signal having a different delay time is transmitted from each relay station 3 to the terminal station 4.

In step S011, the control circuit 32 determines whether or not a relay permission notification continues, that is, determines whether or not the non-regenerative relay processing ends. In this case, when a determination is made that the non-regenerative relay processing ends, processing of FIG. 10 ends, and when a determination is made otherwise, the processing returns to step S001. Parameters used for calculation of $\Delta\_(max,i)$ (propagation delay $\tau\_(UE \rightarrow R,i)$, propagation delay $\tau\_(BS \rightarrow R,i)$, processing delay $\tau\_(R,i)$, and $\delta\_(i)$) are updated in units of slots or in units of radio frames.

Second Embodiment

Next, a communication system according to a second embodiment will be described. Since the second embodiment has points in common with the first embodiment, differences will be mainly described, and description of the common points will be omitted. In the second embodiment, a case in which each relay station (the relay station #i) constituting a relay station group performs non-regenerative relay using two or more antennas #k will be described. k indicates the number of the antenna in the relay station #i.

Figure 11:
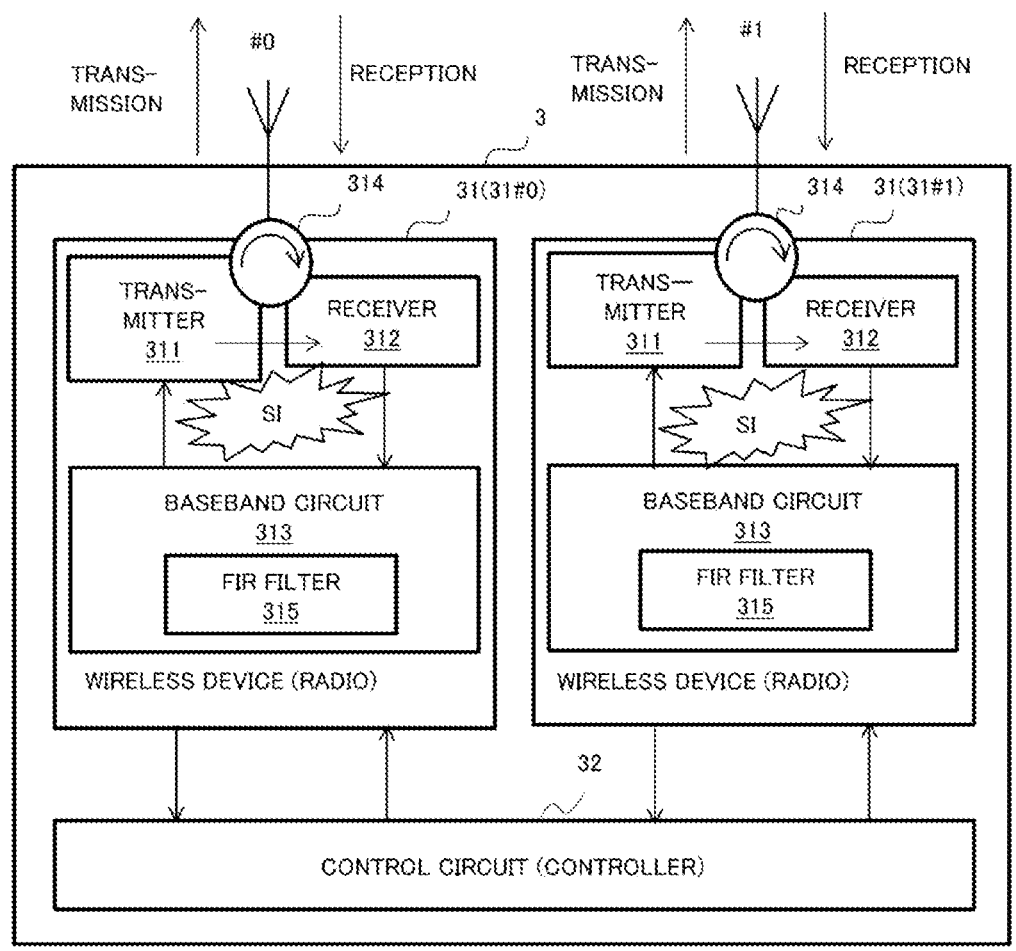
FIG. 11 is a diagram illustrating a configuration example of a relay station in the second embodiment.

FIG. 11 is a diagram illustrating an example of a hardware configuration of the relay station 3 according to the second embodiment. The relay station 3 includes two antennas #0 and #1 (examples of a plurality of antennas), a plurality of wireless devices 31 corresponding to the plurality of antennas (antennas #0 and #1), and a control circuit 32 (an example of a controller) that controls each wireless device 31. In FIG. 11, the wireless device 31 includes a wireless device 31 #0 corresponding to antenna #0 and a wireless device 31 #1 corresponding to antenna #1. In the following description, the wireless device 31 #0 and the wireless device 31 #1 are referred to as the wireless device 31 when the wireless device 31 #0 and the wireless device 31 #1 are not distinguished from each other. The wireless device 3110 and the wireless device 31 #1 have the same configuration as the wireless device 31 (FIG. 3) described in the first embodiment (each includes an FIR filter 315). Therefore, detailed description of the wireless device 31 #0 and the wireless device 31 #1 will be omitted. Thus, the relay station 3 according to the second embodiment includes a plurality of FIR filters corresponding to a plurality of antennas.

The control circuit 32 performs the same processing as in the first embodiment. However, the control circuit 32 according to the second embodiment calculates the delay time corresponding to each antenna (each of antennas #0 and #1), and sets the delay time in each of the FIR filter 315 (corresponding to antenna #0) of the wireless device 3110, and the FIR filter 315 (corresponding to the antenna #1) of the wireless device 31 #1.

Figure 12:
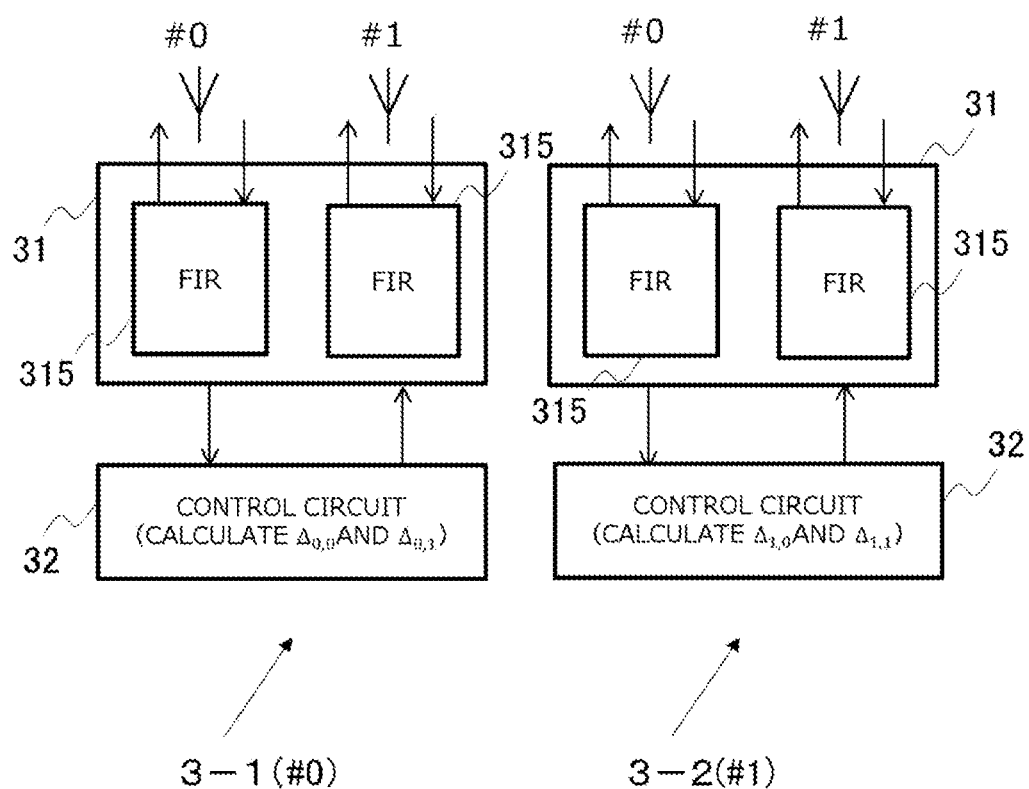
FIG. 12 is an illustrative diagram of processing in the relay station in the second embodiment.
Figure 13:
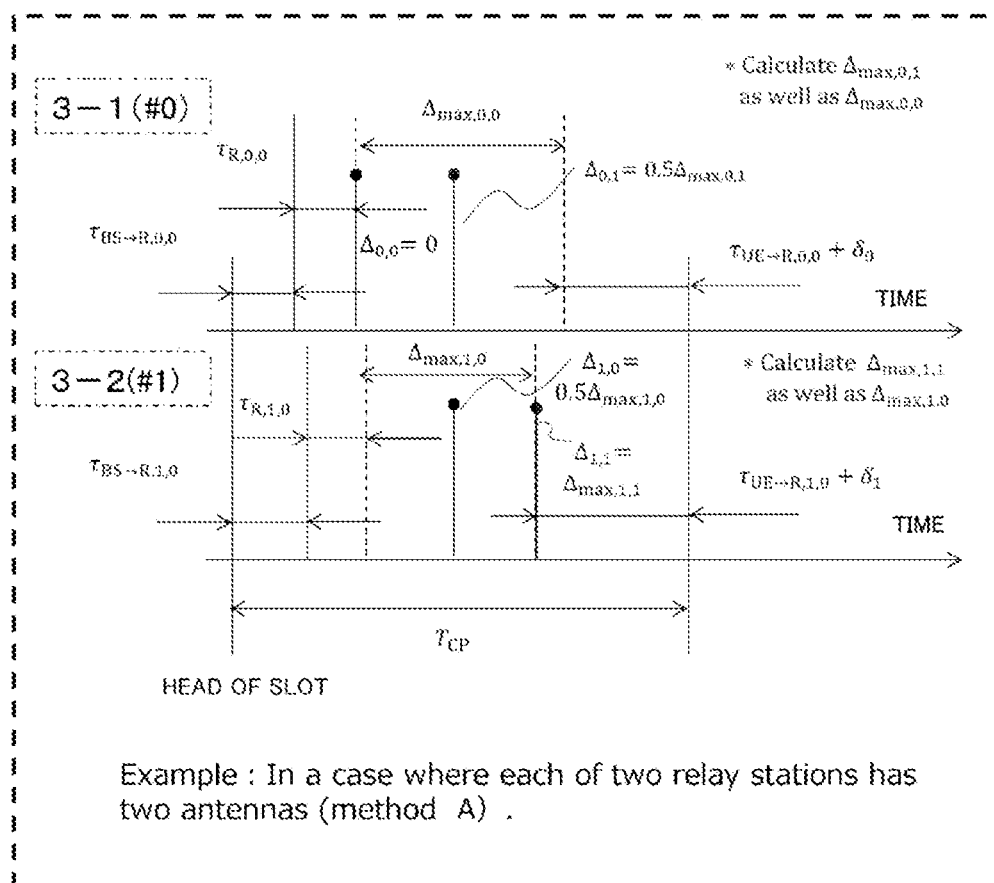
FIG. 13 is an illustrative diagram of processing in the relay station in the second embodiment.

FIGS. 12 and 13 are illustrative diagrams of processing in the relay station 3 constituting the relay station group in the second embodiment. In FIG. 6, the relay station 3-1 (relay station #0) and the relay station 3-2 (relay station #1) are shown as examples of two or more relay stations 3 (the relay station #i). Each of the relay stations 3-1 and 3-2 has the configuration illustrated in FIG. 11, which is simplified in FIG. 12.

In the relay station 3-1, the control circuit 32 calculates a delay time $\Delta\_(i,k)$ assigned to each of the antennas #0 and #1 included in the relay station 3-1, that is, $\Delta\_(0,0)$ and $\Delta\_(0,1)$. In the relay station 3-1, the FIR filter 315 corresponding to the antenna #k (0 or 1) performs processing of each of removal of the self-interference (SI) and assignment of a delay time $\Delta\_(0,k)$ on the baseband signal obtained through conversion of the radio signal (the first radio signal) received by the antenna #k, and outputs a signal after processing. The output signal of the FIR filter 315 is converted into a radio signal (second radio signal) and radiated from the antenna #k of the relay station 3-1.

In the relay station 3-2, the control circuit 32 calculates the delay time $\Delta\_(i,k)$ to be assigned to each of the antennas #0 and #1 included in the relay station 3-2, that is, $\Delta\_(1,0)$ and $\Delta\_(1,1)$. In the relay station 3-2, the FIR filter 315 corresponding to the antenna #k (0 or 1) performs processing of each of removal of the self-interference (SI) and assignment of a delay time $\Delta\_(1,k)$ on the baseband signal obtained through conversion of the radio signal (the first radio signal) received by the antenna #k, and outputs a signal after processing. The output signal of the FIR filter 315 is converted into a radio signal (second radio signal) and radiated from the antenna #k of the relay station 3-2.

FIG. 13 illustrates a case in which the number of relay stations 3 constituting the relay station group is two (the relay station 3-1(#0) and the relay station 3-2(#1)), and each of the relay stations 3-1 and 3-2 has two antennas (#k=0 or 1) (two antennas are used for non-regenerative relay). Each of the relay stations 3-1 and 3-2 communicates with the base station 2 and the terminal station 4 using CP-OFDM.

Calculation of delay times $\Delta\_(0,0)$ and $\Delta\_(0,1)$ performed by the relay station 3-1, and the calculation of delay times $\Delta\_(1,0)$ and $\Delta\_(1,1)$ performed by the relay station 3-1 are performed for each radio frame or for each slot constituting the radio frame.

The relay stations 3-1 and 3-2, that is, the relay station #i acquires a propagation delay $\tau\_(UE \rightarrow R,i,k)$, a propagation delay $\tau(BS \rightarrow R,i,k)$, a processing delay $\tau\_(R,i,k)$, and $\delta\_(i)$ through measurement or calculation regarding the antenna #k included in the own station. For a measurement or calculation scheme, the same scheme as in the first embodiment can be applied. Each relay station uses a number of i and k assigned to its own station in the calculation.

The relay stations 3-1 and 3-2, that is, the relay station #i uses the acquired propagation delay $\tau\_(UE \rightarrow R,i,k)$, a propagation delay $\tau(BS \rightarrow R,i,k)$, a processing delay $\tau\_$ Using $(R,i,k)$, and $\delta\_(i)$ to calculate the maximum delay $\Delta\_(max, i,k)$. That is, the relay station 3-1(#0) calculates maximum delays $\Delta\_(max,0,0)$ and $\Delta\_(max,0,1)$, and the relay station 3-2(#1) calculates maximum delays $\Delta\_(max,1,0)$ and $\Delta\_(max,1,1)$.

The maximum delay $\Delta\_(max,i,k)$ is calculated, for example, by using a calculation "$\Delta\_(max,i,k)=T\_(CP)-(\tau\_(UE \rightarrow R,i,k)+\tau\_(R,i,k)+\tau\_(BS \rightarrow R,i,k)+5 (i))$".

The delay time $\Delta\_(i,k)$ for each antenna in each relay station can be obtained, for example, using method A and method B below.

(Method A) The relay station #i ($0 \leq i < N\_(R)$) can obtain a maximum delay $\Delta\_(max,i,k)$ by using a calculation equation "$\Delta\_(i,k)=(I+k) \cdot \Delta\_(max,i,k)/(N\_(R)-2+N\_(ANT,i))$" using the number of relay stations N_(R) and the number of antennas N_(ANT), for antenna #k ($0 \leq k < N\_(ANT,i)$).

(Method B) $\Delta\_(i,k)=x(i,k) \cdot \Delta\_(max,i,k)$ is defined, and x(i,k) is calculated by giving a random variable that follows a uniform distribution.

In FIG. 13, a state in which the relay station 3-1(#0) uses method A to calculate a delay time $\Delta\_(0,0)=0$ and a delay time $\Delta\_(0,1)=0.5\Delta\_(max,0,1)$ is shown. Further, a state in which the relay station 3-2(#1) uses method A to calculate a delay time $\Delta\_(1,0)=0.5\Delta\_(max,1,0)$ and a delay time $\Delta\_(1,1)=\Delta\_(max,1,1)$ are shown.

A propagation delay $\tau\_(BS \rightarrow R,i,k)$, a processing delay $\tau\_(R,i,k)$, a propagation delay $\tau\_(UE \rightarrow R,i,k)$, $\delta\_(i)$, and a maximum delay $\Delta\_(max,i,k)$ can be measured and calculated by the control circuit 32 of the relay station #i. However, the measurement and calculation may be performed by a circuit other than the control circuit 32.

The control circuit 32 calculates a delay time $\Delta\_(i,k)$ different between the relay station 3-1(#0) and the relay station 3-2(#1) and between the antennas of the respective relay stations so that an inequality "$\Delta\_(i,k) \Delta\_(max,i,k)$" is satisfied, and sets $\Delta\_(i,k)$ in the FIR filter 315 corresponding to the antenna #k. However, the delay time $\Delta\_(i,k)$ is set in the FIR filter 315 in a state in which the delay time $\Delta\_(i,k)$ has been discretized by the delay time $(\tau\_(D))$ per tap included in the FIR filter 315.

The FIR filter 315 assigns a delay to the input baseband signal. However, as illustrated in FIG. 13, the second radio signal transmitted from the antennas #0 and #1 of the relay stations 3-1 and 3-2 is transmitted at a timing when the signal reaches the terminal station 4 within the CP time (T_(CP)).

Since the processing in the control device 1 in the second embodiment is the same as the processing of S01 to S03 illustrated in FIG. 8, description thereof will be omitted. Information indicating the number of antennas N_(ANT) used for non-regenerative relay may be transmitted to each relay station constituting the relay station group. However, the control circuit 32 of each relay station may receive relay permission from the control device 1 and determine the number of antennas N_(ANT) and the antenna number #i to be used for non-regenerative relay.

Figure 14:
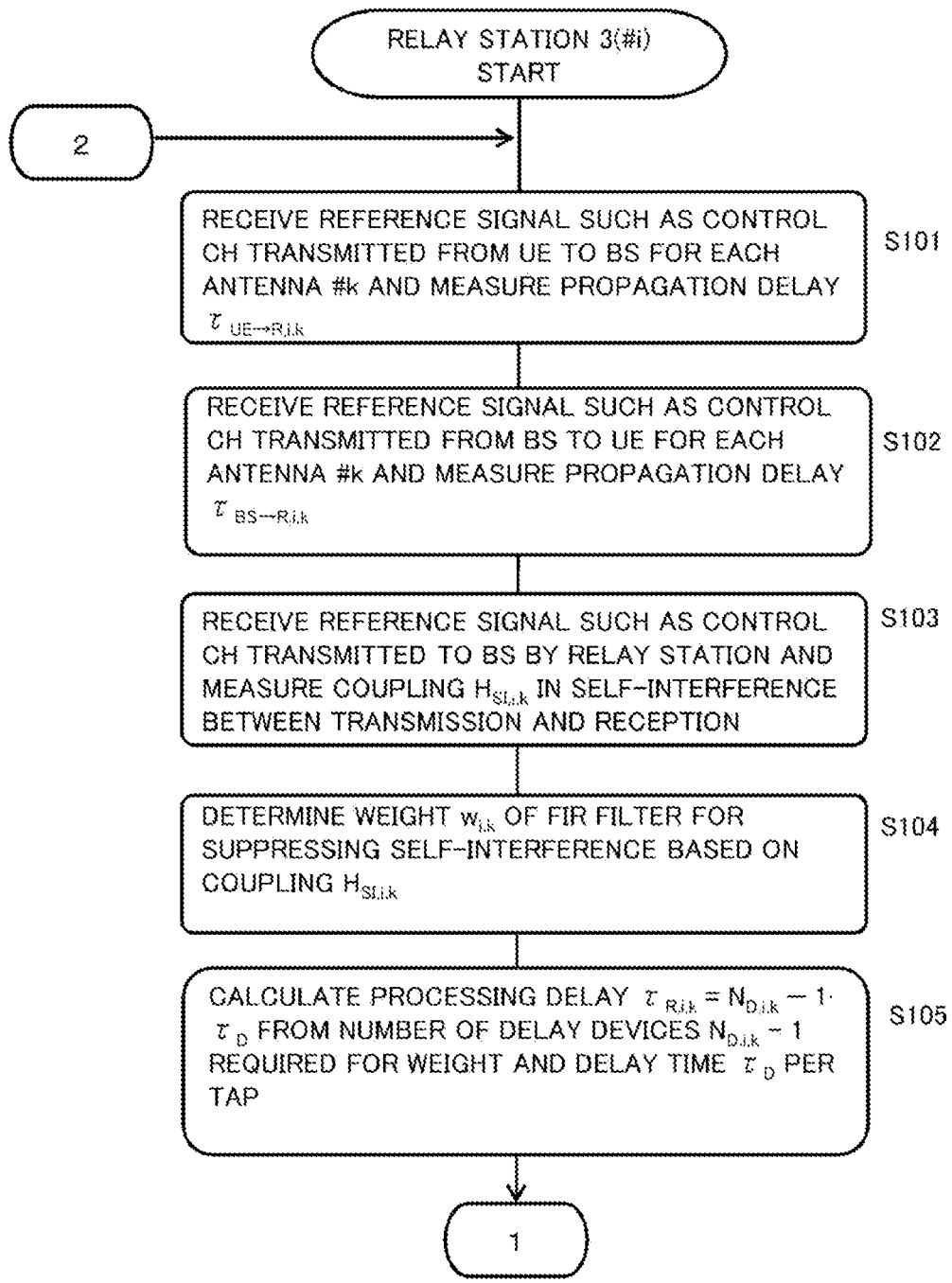
FIG. 14 is a flowchart illustrating an example of processing of the relay station in the second embodiment.
Figure 15:
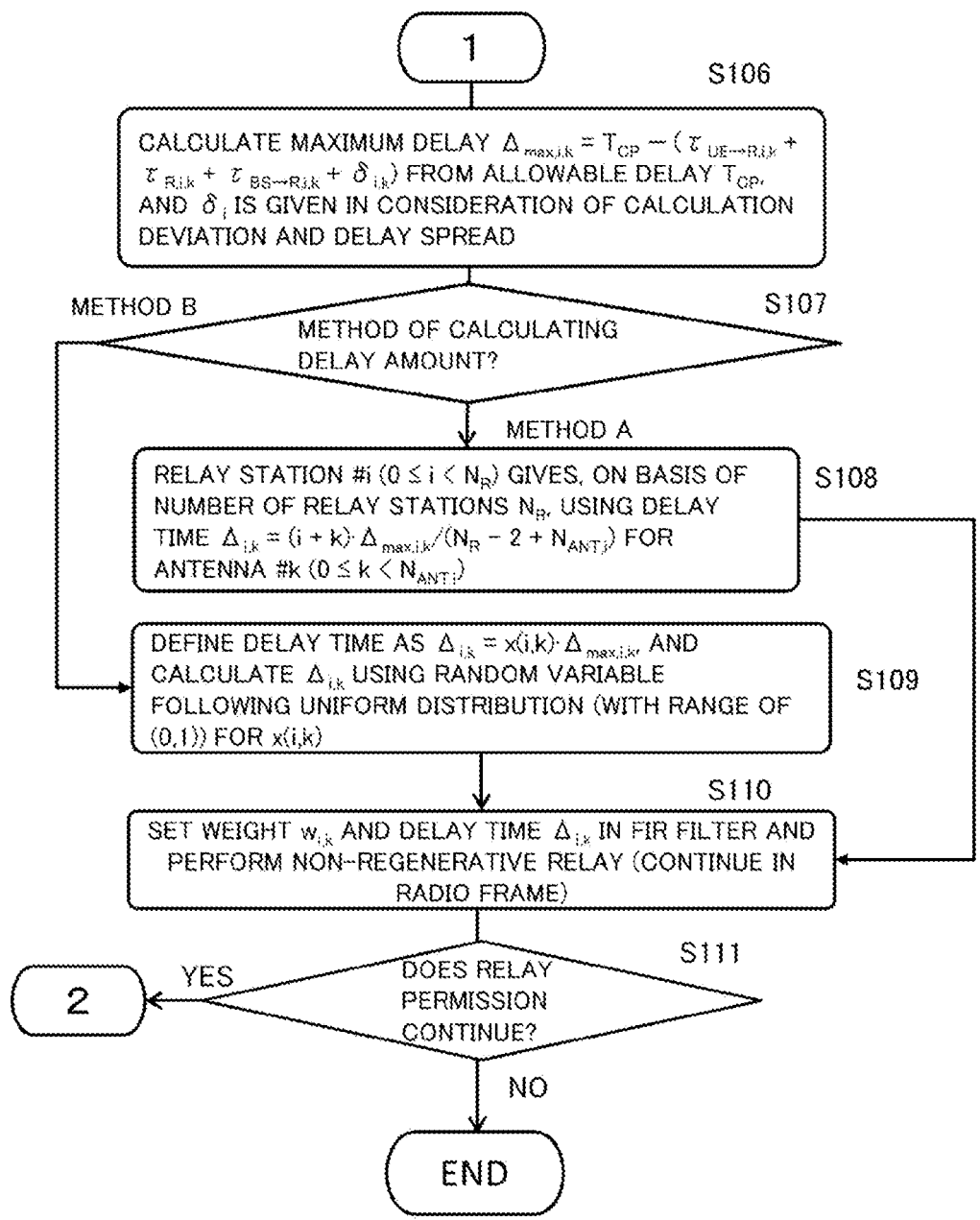
FIG. 15 is a flowchart illustrating an example of processing of the relay station in the second embodiment.

FIGS. 14 and 15 are flowcharts illustrating an example of processing of each relay station 3 included in the relay station group according to the second embodiment. The processing illustrated in FIGS. 14 and 15 is executed by the control circuit 32 of each relay station 3, for example. Further, the processing illustrated in FIGS. 14 and 15 is started when an instruction (control signal) including relay permission from the control device 1 is received.

In step S101, the control circuit 32 measures the propagation delay $\tau\_(UE \rightarrow R,i,k)$ of the transmission path of the radio signal from the terminal station 4 to the relay station 3. When there are a plurality of target terminal stations 4, the control circuit 32 determines a value serving as the maximum propagation delay as $\tau\_(UE \rightarrow R,i,k)$.

In step S102, the control circuit 32 measures the propagation delay $\tau\_(BS \rightarrow R,i,k)$ of the radio signal propagation path from the base station 2 to the relay station 3.

In step S103, the coupling H_(SI,i,k) in self-interference (SI) is measured.

In step S104, the control circuit 32 determines the weight w_(i,k) of the FIR filter 315 for curbing self-interference on the basis of the coupling H_(SI,i,k).

In step S105, the control circuit 32 calculates the processing delay $\tau\_(R,i,k)$ from the number of delay devices N_(D,i,k)−1 required for the weight and the delay time τ_(D) per tap. An order of processing from step S101 to step S105 is an example, and the order may be changed in any way.

In step S106, the control circuit 32 uses the allowable delay T_(CP), the propagation delay τ_(UE→R,i,k), the propagation delay τ_(BS→R,i,k), the processing delay τ_(R,i,k), and δ_(i) to calculate the maximum delay Δ_(max,i,k) for each relay station and antenna.

In step S107, the control circuit 32 determines which of method A and method B is to be executed as a method of calculating the delay time. When a determination is made that the method A is to be executed, the processing proceeds to step S008, and when a determination is made that the method B is to be executed, the processing proceeds to step S009.

In step S108, the control circuit 32 calculates the delay time for the relay station #i (the own relay station) by using a calculation equation "Δ_i,k=(i+k)·Δ_(max,i,k)/(N_(R)−2+N_(ANT,i))". Thereafter, the processing proceeds to step S010.

In step S109, the control circuit 32 calculates the delay time by using a calculation equation "Δ_(i,k)=x_(i,k)·Δ_(max,i,k)". In this case, x_(i,k) is calculated by giving a random variable following a uniform distribution (with a range of (0, 1)).

In step S110, non-regenerative relay is performed. That is, the control circuit 32 sets the weight w_(i,k) and the delay time Δ_(i,k) in the FIR filters 315 corresponding to the antennas #0 and #1 of its own station. In each wireless device 31 of each relay station, the first radio signal received by antennas #0 and #1 is converted into a baseband signal, assigned a delay by the corresponding FIR filter 315, converted into the second radio signal, and transmitted to the terminal station 4 from the antennas #0 and #1.

In step S111, the control circuit 32 determines whether or not the relay permission notification continues, that is, whether or not the non-regenerative relay processing ends. In this case, when a determination is made that the non-regenerative relay processing ends, the processing of FIG. 15 ends, and when a determination is made that the non-regenerative relay processing does not end, the processing returns to step S101. Parameters used for calculation of Δ_(max,i,k) (the propagation delay τ_(UE→R,i,k), the propagation delay τ_(BS→R,i,k), the processing delay τ_(R,i,k), and δ_(i)) are updated on a radio frame basis.

Third Embodiment

Next, a communication system according to a third embodiment will be described. Since the third embodiment has points in common with the first or second embodiment, differences will be mainly described, and description of the common points will be omitted. In the third embodiment, a case in which each relay station (the relay station #i) constituting the relay station group acquires (receives) the delay time Δ_(i) or Δ_(i,k) from the control device 1, and sets the delay time in the FIR filter 315 will be described.

Figure 16:
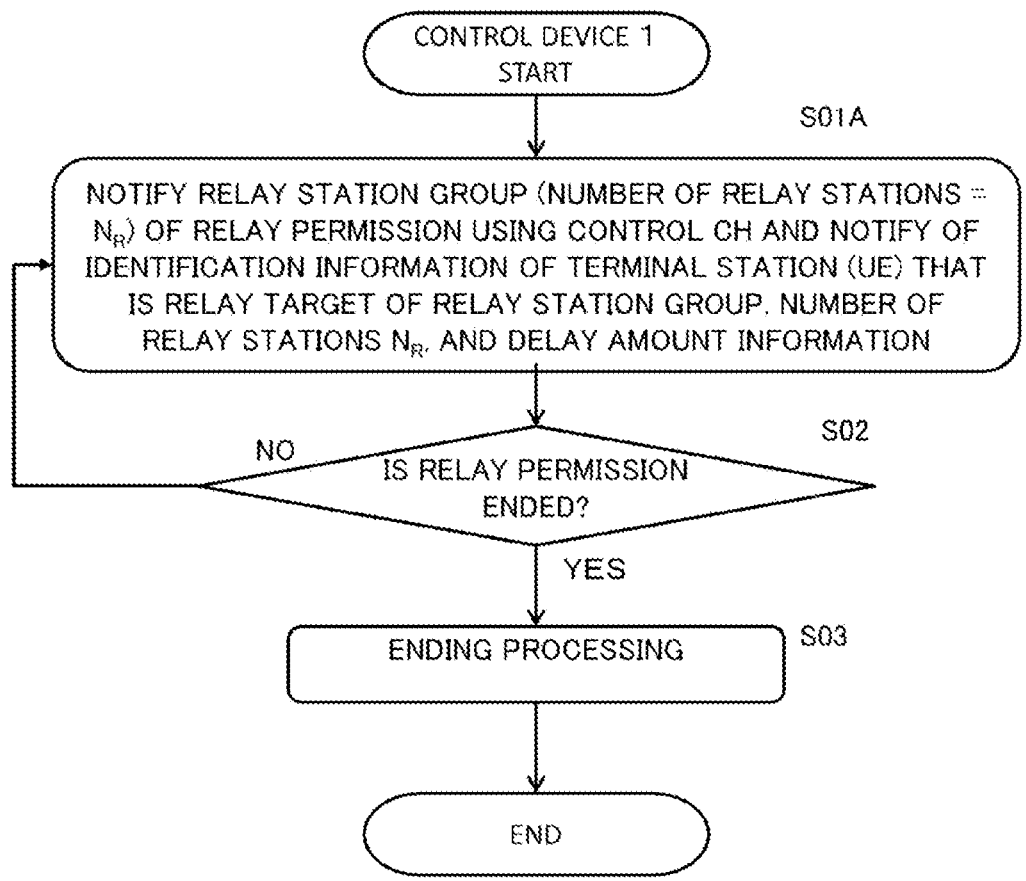
FIG. 16 is a flowchart illustrating an example of processing of a control device in a third embodiment.

FIG. 16 is a flowchart illustrating an example of processing of the control device 1 according to the third embodiment. In step S01A, the control device 1 includes information to be transmitted to each relay station in the first or second embodiment, and delay amount information includes information of the delay time Δ_(i) or Δ_(i,k) that each relay station sets in each FIR filter 315 included in the relay station. For the information of the delay time Δ_(i) or Δ_(i,k), a value determined on the basis of experiments, operational results, or the like can be applied. The delay amount information may further include the number of antennas N_(ANT). Since steps S02 and S03 are the same as those in the first embodiment, description thereof will be omitted.

Figure 17:
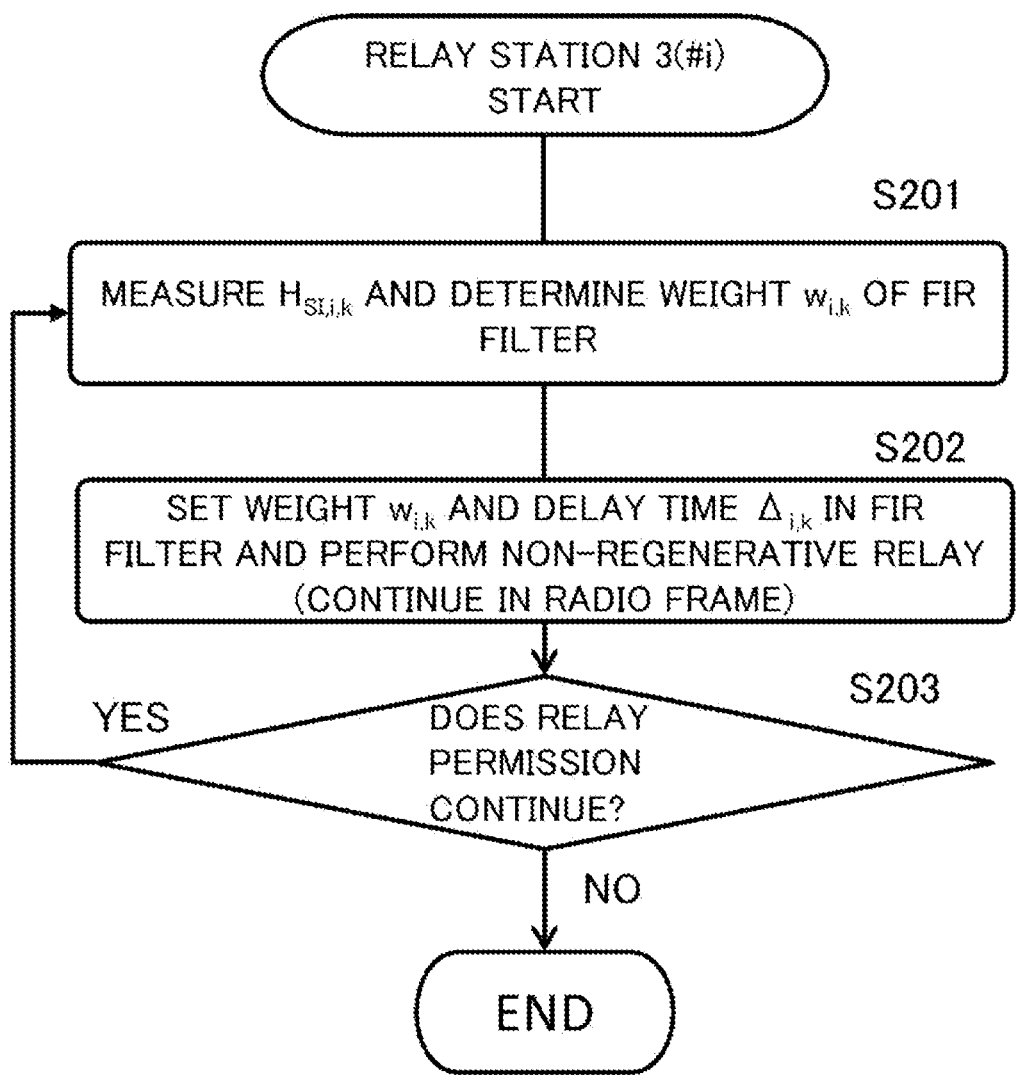
FIG. 17 is a flowchart illustrating an example of processing of a relay station in the third embodiment.

FIG. 17 is a flowchart illustrating an example of processing of each relay station according to the third embodiment. The processing illustrated in FIG. 17 is started when each relay station receives (acquires) the information transmitted by the control device 1 in step S01A. Step S201 is processing corresponding to steps S003 and S004 in the first embodiment and steps S103 and S104 in the second embodiment, and determines weights for curbing self-interference.

In step S202, the control circuit 32 sets the weight determined in step S201 and the delay time acquired from the control device 1, in the FIR filter 315. Thereafter, the relay station performs the non-regenerative relay processing described in the first and second embodiments.

Since the processing of step S03 is the same as step S011 in the first embodiment and step S111 in the second embodiment, description thereof will be omitted. Each relay station may measure or calculate the propagation delay between the terminal station and the relay station, the propagation delay between the base station and the relay station, the processing delay, and the value of δ described in the first or second embodiment, and transmit these to the control device 1. In this case, the control device 1 may obtain an estimated value of the delay time on the basis of these parameters and include the estimated value in the delay amount information to be transmitted to each relay station.

The communication system 100A or 100B in the first to third embodiments includes a relay station (for example, the relay station 3-1) that operates as a first relay station, and can execute non-regenerative relay for the first radio signal transmitted from a transmission station (for example, the base station 2 or the distributed base station) to a reception station (for example, the terminal station 4) having one antenna, together with one or two or more second relay stations (for example, the relay station 3-2). The relay station 3-1 includes at least one antenna (antenna #0), a wireless device 31 corresponding to the antenna #0, and a controller (control circuit 32) that controls an operation of the wireless device 31. The wireless device 31 includes a receiver 312 that converts the first radio signal received by the antenna #0 into a baseband signal, an FIR filter 315 that assigns a delay to the baseband signal, and a transmitter 311 that converts a signal output from the FIR filter 315 into a second radio signal that is transmitted from the antenna #0 to the reception station (terminal station 4). The control circuit 32 sets a delay time in the FIR filter 315 of the wireless device 31 so that the second radio signal transmitted from each antenna #0 included in the relay stations 3-1 and 3-2 have delays different between the relay stations 3-1 and 3-2.

In the communication system 100A or 100B, it is possible to cause the second radio signals transmitted from the relay stations 3-1 and 3-2 to have the delay diversity, and for the terminal station 4 to obtain a suitable diversity effect. When transmission diversity is applied to the first radio signal from the base station 2 or the distributed base station 2B, a correlation with the first radio signal is degraded due to the delay of the second radio signal, and thus, it is possible to obtain a suitable diversity gain in the terminal station 4. It is possible to improve the SIR and SINR of the reception signal in the reception station by a suitable diversity effect or diversity gain being obtained.

In the communication system 100A or 100B, each of the relay stations 3-1 and 3-2 may include two or more antennas (antennas #0 and #1) and two or more wireless devices (3110 and 31 #2) corresponding to the two or more antennas (second embodiment). In this case, the controller (control circuit 32) included in each of the relay stations 3-1 and 3-2 sets a delay time in the FIR filter 315 included in each of the radio devices 3110 and 31 #2 of each relay station so that the second radio signal transmitted from each of the antennas #0 and #1 included in each of the relay stations 3-1 and 3-2 has delays different between the relay stations and the antennas included in the relay stations. In such a case, the reception station can obtain a suitable diversity effect, as in the first embodiment. In the second embodiment, although the number of antennas in each of the relay stations 3-1 and 3-2 is two, the number of antennas may be different between the relay stations.

In the first and second embodiments, the control circuit 32 (controller) can use a first propagation delay ($\tau\_(UE \rightarrow R,i)$ or $\tau\_(UE \rightarrow R,i,k)$) that is a propagation delay in the radio signal propagation path from the reception station to the relay station 3, the second propagation delay ($\tau\_(BS \rightarrow R,i)$ or $\tau\_(BS, R,i,k)$) that is a propagation delay in the radio signal propagation path from the transmission station to the relay station 3, and a signal processing delay ($\tau\_(R,i)$ or $\tau\_(R,i,k)$) in the relay station 3 to obtain the maximum delay ($\Delta\_(max,i)$ or $\Delta\_(max,i,k)$). It is possible to calculate the delay time that each FIR filter 315 assigns to each of the plurality of antennas within a range in which the maximum delay is not exceeded.

In this case, the control circuit 32 (controller) can calculate a maximum delay in which at least the first propagation delay, the second propagation delay, and the processing delay have been subtracted from a cyclic prefix time (CP time, that is, T_(CP)) used for communication with the transmission station and the reception station by the relay station 3. Further, as illustrated in a maximum delay calculation equation, the value of 5 may be further subtracted.

The control circuit 32 (controller) may calculate a delay time to be set in the FIR filter 315 included in each of the two or more wireless device 31 so that a transmission timing of the second radio signal arrives at equal intervals, with respect to each of the two or more antennas (antennas #0 and #1).

Further, the control circuit 32 (controller) may randomly calculate the delay time to be set in each FIR filter 315 included in the plurality of wireless devices 31.

Further, the control circuit 32 (controller) in the embodiment performs weighting (setting of the weight w_(i) or weight w_(i,k)) for the FIR filter 315 so that self-interference related to reception of the first radio signal and transmission of the second radio signal is curbed. This makes it possible to assign a delay and curb the self-interference.

Further, as illustrated in the third embodiment, each relay station 3 may acquire the delay time to be set in each FIR filter 315 from the control device 1.

Fourth Embodiment

Hereinafter, a fourth embodiment will be described. Since the fourth embodiment has a configuration in common with the first embodiment, differences will be mainly described. A system configuration of the fourth embodiment can provide the same configuration as the first embodiment (see FIGS. 1 and 2). However, in the first embodiment, the control circuit 32 of the relay station 3 measures the propagation delay, processing delay, and the like, and calculates the delay time $\Delta\_(k)$. In the fourth embodiment, the relay start time T_(i) of each relay station 3 is performed by the control circuit 22 (FIG. 1) of the base station 2 or the control device 1 (FIG. 1). The control circuit 22 of the base station 2 may be the control circuit 22A (FIG. 2) of the distributed base stations 2B-1 to 2B-k.

Figure 18:
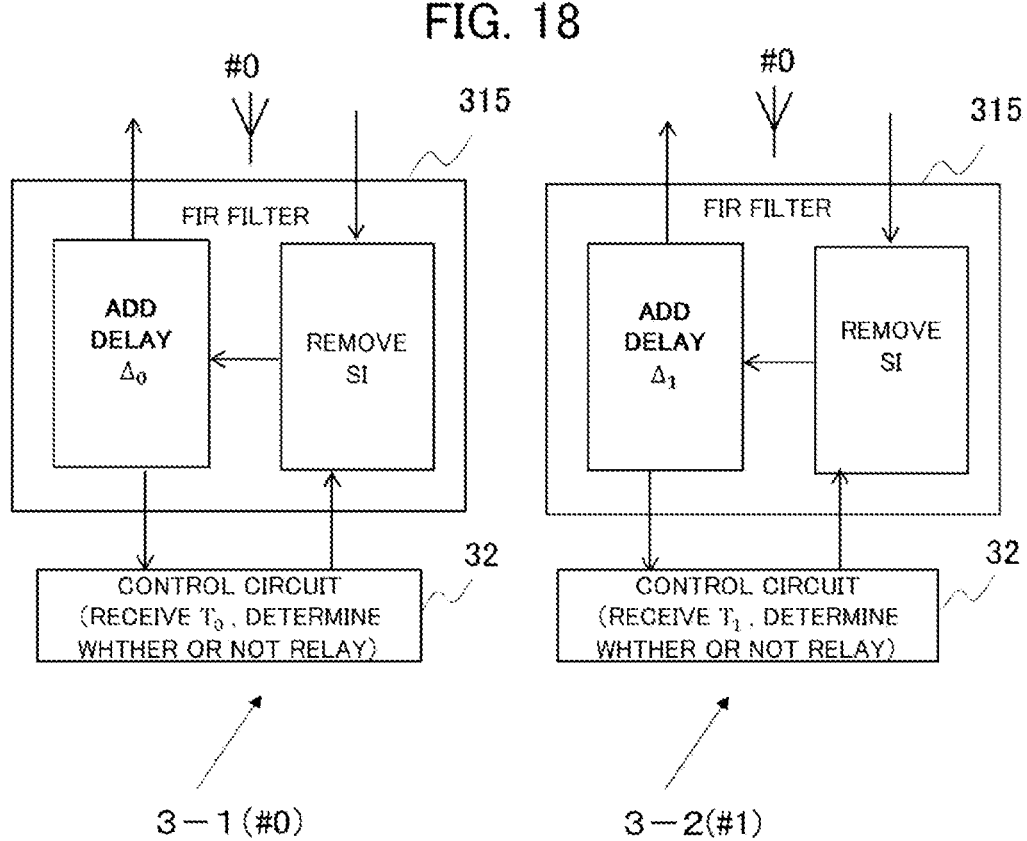
FIG. 18 is an illustrative diagram of processing of a relay station in a fourth embodiment.
Figure 19:
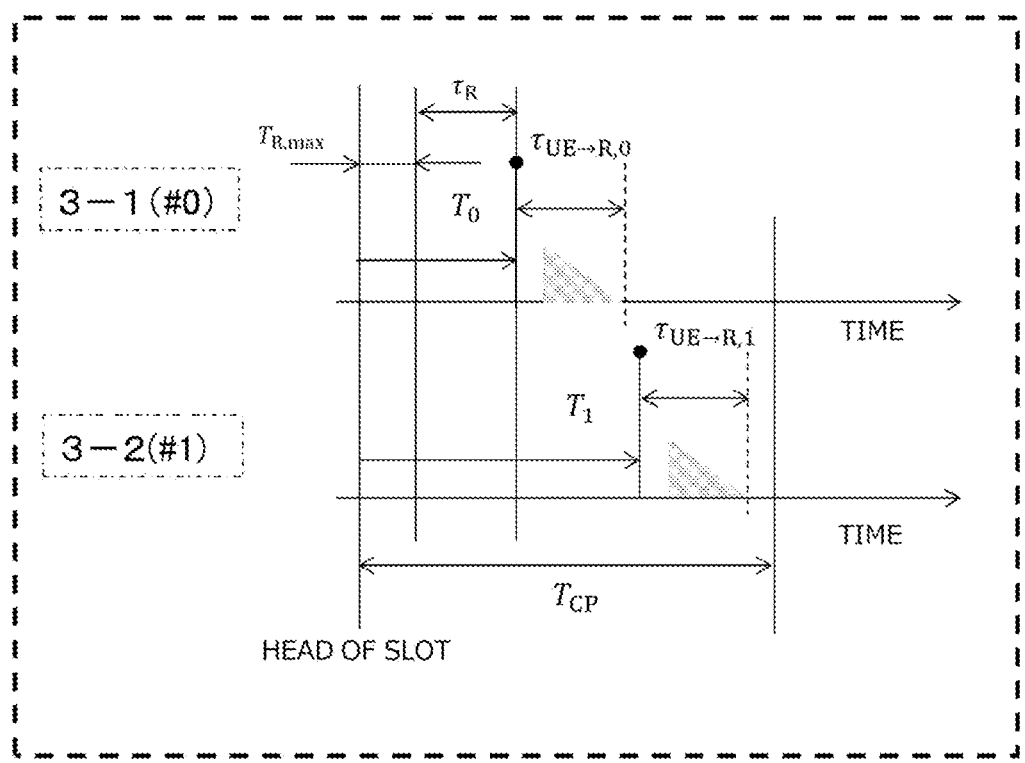
FIG. 19 is an illustrative diagram of the processing of the relay station in the fourth embodiment.

Hereinafter, differences between the fourth embodiment and the first embodiment will be described. FIGS. 18 and 19 are illustrative diagrams of the processing of the relay station in the fourth embodiment. FIG. 18 schematically illustrates operations of the relay stations 3-1 and 3-2. The fourth embodiment differs from the first embodiment (FIG. 6) as follows. In FIG. 18, the relay station 3-1(#0) receives (acquires) the delay time T_(0) serving as the delay time T_(i) calculated by the control circuit 22 of the base station 2 or the control device 1. The relay station 3-2(#1) receives (obtains) the delay time T_(1) serving as the delay time T_(i) calculated by the control circuit 22 of the base station 2 or the control device 1.

The control circuit 32 of the relay station 3-1 determines whether or not a signal to be relayed can be relayed, on the basis of the delay time T_(0), the processing delay $\tau\_(R,0)$ in the relay station 3-1, and measurement results of the propagation delay $\tau\_(UE \rightarrow R,0)$. In this case, the control circuit 32 does not transmit the signal when a transmission timing of the signal from the relay station 3 is a timing at which the terminal station 4 cannot appropriately demodulate and decode the signal received from the relay station 3. On the other hand, when the signal transmission timing is a timing at which the terminal station 4 can appropriately demodulate and decode the reception signal, the control circuit 32 sets the delay time $\Delta\_(i)$ according to the relay start time T_(i) in the FIR filter 315. That is, as illustrated in FIG. 18, the control circuit 32 of the relay station 3-1 sets the delay time $\Delta\_(0)$ according to $\tau\_(0)$ in the FIR filter 315, and the control circuit 32 of the relay station 3-2 sets the delay time $\Delta\_(1)$ according to $\tau\_(1)$ in the FIR filter 315.

In FIG. 19, the relay start times $\tau\_(0)$ and $\tau\_(1)$ for the relay stations 3-1(#0) and 3-2(#1) are calculated so that the propagation delay $\tau\_(UE \rightarrow R,i)$ between the terminal station 4 and the relay station 3#i falls within the allowable delay T_(CP). This makes it possible for the terminal station 4 to receive the signals transmitted from the relay stations 3-1 and 3-2 before the end time of the allowable delay T_(CP) arrives. Therefore, it is possible to appropriately demodulate and decode each reception signal, and obtain a suitable diversity effect. Details of the relay start time T_(i) will be described later.

Figure 20:
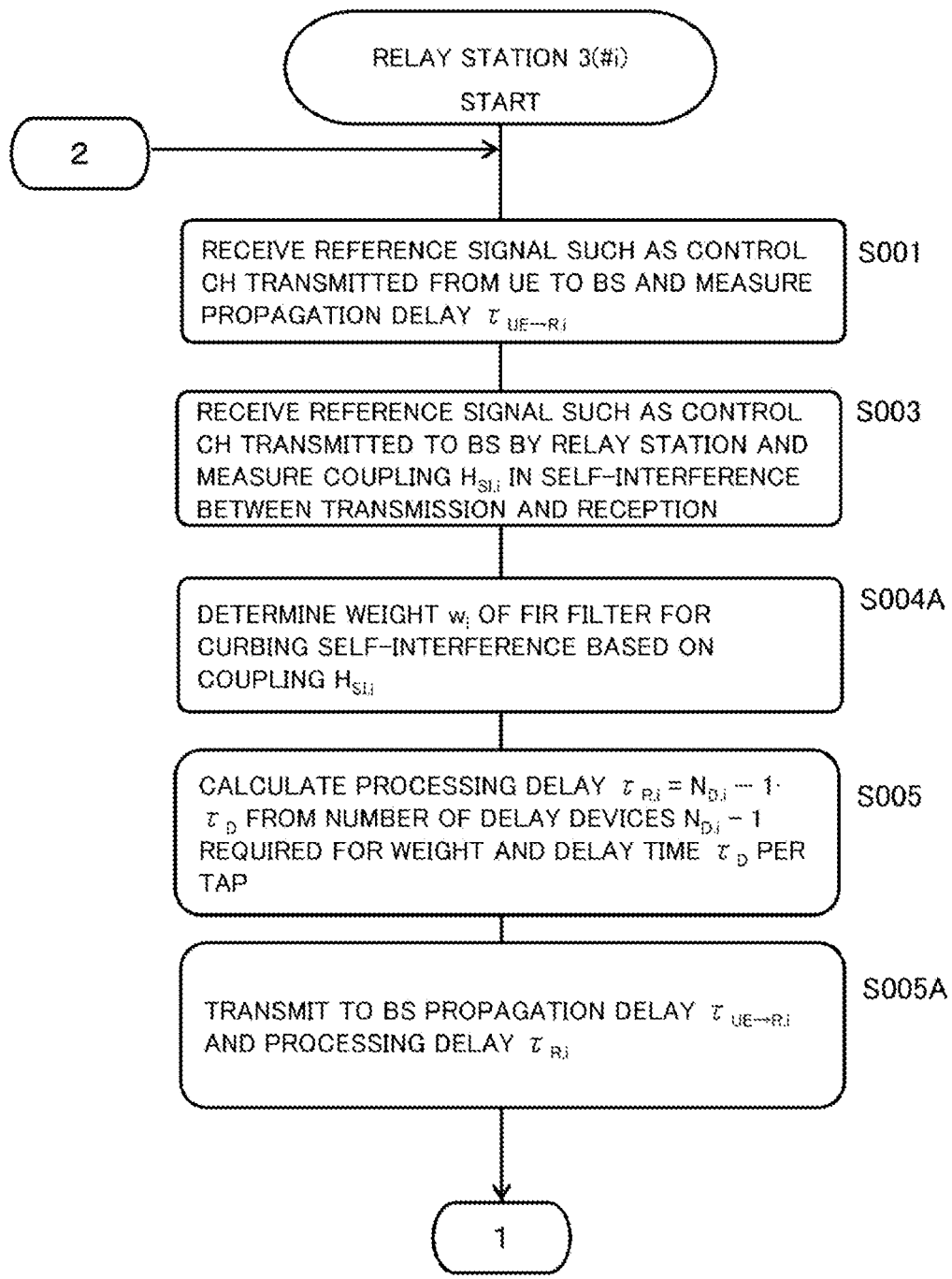
FIG. 20 is a flowchart illustrating an example of processing of the relay station in the fourth embodiment.
Figure 21:
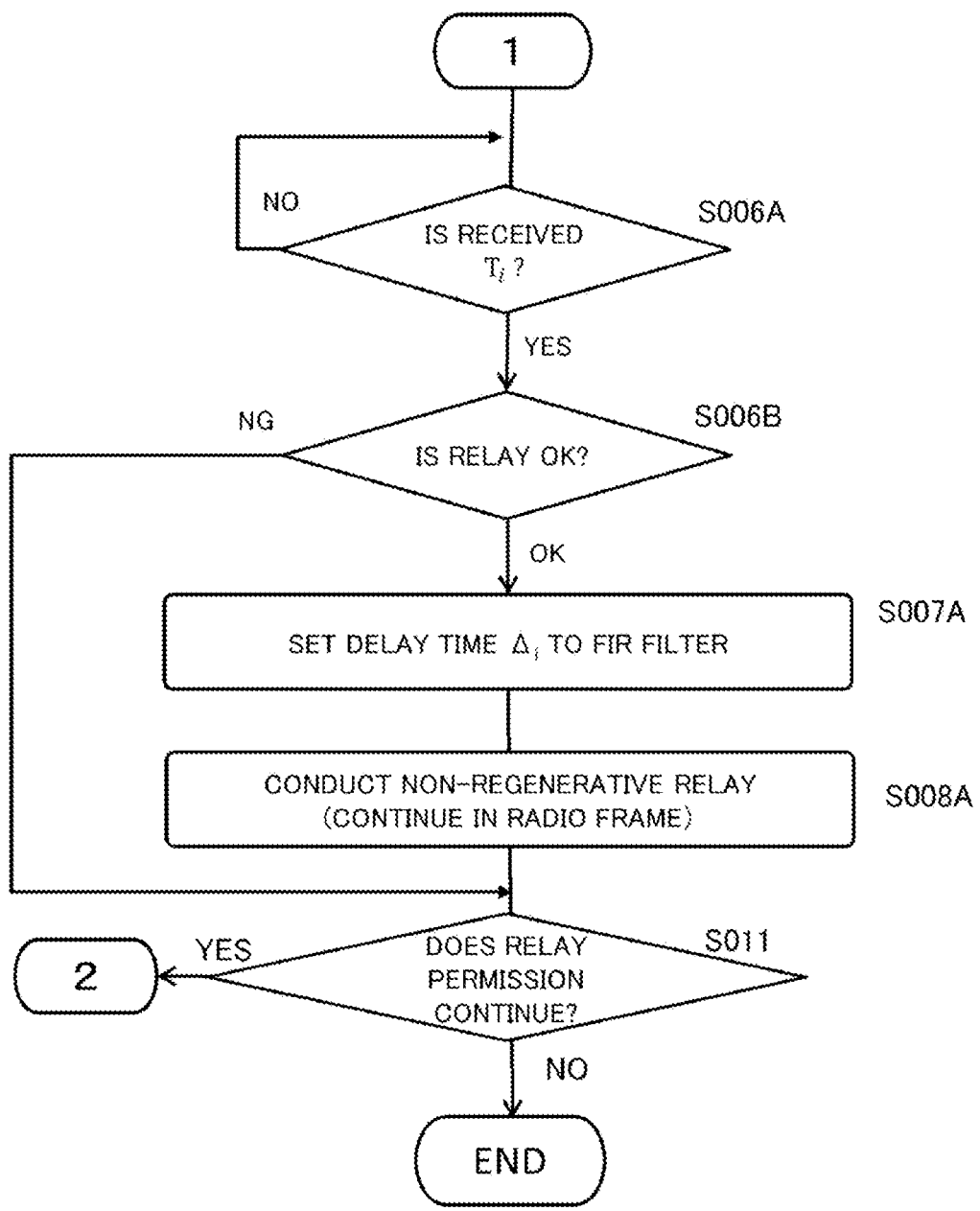
FIG. 21 is a flowchart illustrating an example of processing of the relay station in the fourth embodiment.
Figure 22:
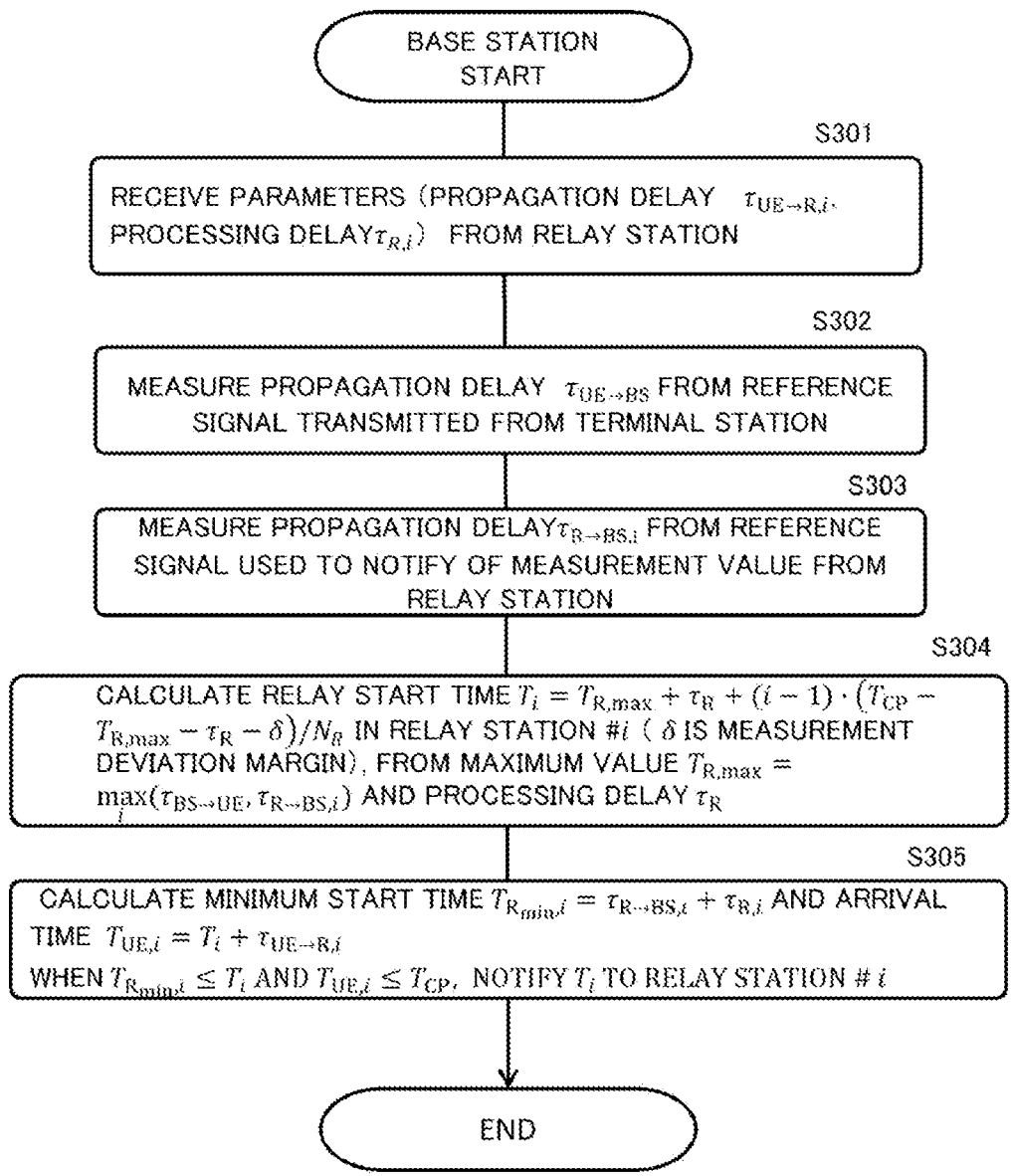
FIG. 22 is a flowchart illustrating an example of processing of a base station in the fourth embodiment.

FIGS. 20 and 21 are flowcharts illustrating processing (operation) of the relay station 3#i in the fourth embodiment, and FIG. 22 is a flowchart illustrating processing (operation) of the base station 2 in the fourth embodiment.

In FIG. 20, the processing of steps S001, S003, and S005 are the same as in the first embodiment (FIG. 9). On the other hand, in the fourth embodiment, step S002 is omitted, step S004A is provided instead of step S004, and step S005A is provided after step S005.

In step S004A, the control circuit 32 of the relay station #i determines the weight w_(i) for curbing the self-interference, as in step S004 (FIG. 9). Further, the control circuit sets the weight w_(i) in the FIR filter 315. However, a timing of the setting can be appropriately changed, and for example, the setting may be performed together with the setting of the delay time $\Delta\_(i)$ before and after step S007A (FIG. 21).

In step S005A, the control circuit 32 of the relay station #i transmits a propagation delay $\tau(UE \rightarrow R,i)$ measured in step S001 and the processing delay $\tau\_(R,i)$ calculated in step S005 to the base station 2.

In step S301 of FIG. 14, the base station 2 receives a propagation delay $\tau\_(UE \to R)$ and the processing delay $\tau\_(R,i)$ transmitted from the relay station 3.

In step S302, the control circuit 22 of the base station 2 measures a propagation delay $\tau\_(UE \to BS)$ from the reference signal transmitted from the terminal station 4.

In step S303, the control circuit 22 of the base station 2 measures a propagation delay $\tau\_(R \to BS,i)$ between the relay station #i and the base station 2 from a reference signal used for notification of a measured value from the relay station #i. An order of steps S301 to S303 can be appropriately changed.

In step S304, the control circuit 22 calculates the relay start time $T\_(i)$ in the relay station #i. The relay start time $T\_(i)$ is obtained from a maximum propagation delay in the relay station #i, that is, a maximum value $T\_(R,max)=max(\tau\_(BS \to UE), \tau\_(R \to BS,i))$ of the propagation delay $\tau\_(R \to BS,i)$ and the propagation delay $T\_(UE \to BS)$, and a maximum processing delay $T\_(R)$ in the relay station #i. For example, the following calculation equation is used for calculation of the relay start time $T\_(i)$. Calculation equation: Relay start time $T\_(i)=T\_(R,max)+\tau\_(R)+(i-1)\cdot(T\_(CP)-T\_(R,max)-\tau\_(R)-\delta)/N\_(R)$. Here, "$\delta$" is a measurement deviation margin, and "$N\_(R)$" is the number of antennas.

In step S305, the control circuit 22 calculates a minimum start time of the relay in the relay station #i $T\_(R (min),i)=\tau\_(R \to BS,i)+\tau\_(R,i)$, and an arrival time $T\_(UE,i)=T\_(i)+\tau\_(UE \to R,i)$ at a relay destination of a signal relayed by the relay station #i. When $T\_(R (min),i)$ $T\_(i)$ and $\tau\_(UE \to R,i) \leq T\_(CP)$, the control circuit 22 notifies (transmits) the relay station #i of $T\_(i)$. When the above condition is not satisfied in step S305, $T\_(i)$ is not notified.

In step S006A in FIG. 21, the relay station 3#i receives the relay start time $T\_(i)$ transmitted from the base station 2 (YES in S006A). Then, in step S006B, the control circuit 32 of the relay station 3#i determines whether or not the terminal station 4 can receive the signal before the end of $T\_(CP)$ in the terminal station 4 (OK or NG), from observation results of the processing delay $\tau\_(R,i)$ and the propagation delay $\tau\_(UE \to R,i)$.

In step S006B, when the reception OK is determined, the processing proceeds to step S007A and otherwise (when the reception NG is determined), the processing proceeds to step S011. In this case, no signal relay is performed.

In step S007A, the control circuit 32 sets the delay time $\Delta\_(i)$ corresponding to $T\_(i)$ in the FIR filter 315, and performs non-regenerative relay (step S008A). Since the processing of steps S007A and S008A is the same as the processing of step S010 (FIG. 10) in the embodiment except for setting of the weight $w\_(i)$, description thereof will be omitted.

Thus, in the fourth embodiment, the control circuit 22 of the base station 2 calculates the relay start time $T\_(i)$ for each the relay station #i and notifies (transmits) the relay station 3 of the relay start time $T\_(i)$. The control circuit 32 of the relay station 3 uses $T\_(i)$ calculated by the base station 2 to set the delay time $\Delta\_(i)$ and perform the non-regenerative relay. Accordingly, the terminal station 4 can appropriately receive the signal relayed from the relay station #i (3-1 and 3-2), so that the diversity effect in the terminal station 4 is improved.

A configuration in which one of the processing of step S305 and the processing of step S006B is selectively executed may be employed. Moreover, the configuration of the fourth embodiment can also be applied to a configuration in a case in which the relay station 3 has a plurality of antennas (the second embodiment).

The configuration of the fourth embodiment can be applied to a configuration in which the base station 2 transmits parameters for calculation of the relay start time $T\_(i)$ to the control device 1 on the network, and the control device 1 calculates the relay start time $T\_(i)$.

FIG. 23 is a flowchart illustrating an example of processing of the control device 1 in a modification example of the fourth embodiment, and FIG. 24 is a flowchart illustrating an example of processing of the base station 2 in the modification example 2. In the modification example, the control device 1 performs the calculation of $T\_(i)$.

In the processing of the control device 1 in FIG. 23, steps S01A, S01B, and S01C are provided between steps S01 and S02 in the processing (FIG. 8) of the control device 1 in the first embodiment.

In step S01A, the control device 1 receives parameters for calculation of $T\_(i)$ from the base station 2. In step S01B, the control device 1 uses the parameters to calculate $T\_(i)$. In step S01C, the control device 1 notifies the relay station 3#i of $T\_(i)$ when the condition described for step S105 is satisfied. Step S01B is the same processing as step S304 in the fourth embodiment, and step S01C is the same processing as step S305 in the fourth embodiment.

Since the processing of steps S01, S02, and S03 in FIG. 23 is the same as that in the first embodiment, description thereof will be omitted. As a modification example, the calculation of $T\_(i)$ can be performed by the control device 1 on the network instead of by the control circuit 22.

In FIG. 24, steps S304A and S305A are provided instead of steps S304 and S305 illustrated in FIG. 22. In step S304A, the base station 2 transmits parameters for calculation of $T\_(i)$ to the control device 1. In step S305, the base station 2 receives $T\_(i)$ from the control device 1 and transmits $T\_(i)$ to the relay station #i.

As illustrated in the fourth embodiment, the relay station #i may acquire information indicating the relay start time $T\_(i)$ calculated in the base station 2 communicating with the relay station #i or the control device 1 of the relay station #i. The relay station #i can set a delay amount (delay time) according to $T\_(i)$ in the FIR filter 315. In other words, the relay station #i may set, in the FIR filter 315, a delay amount ($\Delta\_(i)$) based on the information ($T\_(i)$) indicating the relay start time calculated in the base station 2 communicating with the relay station #i or the control device 1 of the relay station 3 #i.

The above embodiments are examples and the disclosure may be implemented with appropriate changes to the extent that the gist is not departed from. The processing and means described in the present disclosure may be freely combined and used as long as technical inconsistency is not generated.

A processing step which was described based on the assumption that one device executes that step may be shared by a plurality of devices. Further, a processing step which was described based on the assumption that difference devices execute that step may be executed by one device. In the computer system, a kind of hardware configuration (server configuration) that implements each function may be freely changed.

The present disclosure may also be implemented by supplying a computer program storing the functions described in the above embodiment to a computer, and one or more processors included in the computer reading and executing the program. This computer program may be provided to the computer by a non-transitory computer-readable storage medium that can be connected to the system bus of the computer, or may be provided to the computer via a network. The non-transitory computer-readable storage medium is an arbitrary type of disk, such as a magnetic disk (e.g. Floppy® disk, hard disk drive (HDD)) and an optical disk (e.g. CD-ROM, DVD disk, Blu-ray disk), a read only memory (ROM), a random access memory (RAM), an EPROM, an EEPROM, a magnetic card, a flash memory, an optical card, and an arbitrary type of medium suitable for storing electronic instructions.

What is claimed is:

1. A relay station operating as a first relay station, and capable of executing non-regenerative relay for a first radio signal transmitted from a transmission station toward a reception station having one antenna, together with one or two or more second relay stations, the relay station comprising:
   at least one antenna;
   a wireless device corresponding to the antenna; and
   a controller configured to control an operation of the wireless device,
   wherein the wireless device includes:
   a receiver configured to convert the first radio signal received by the antenna into a baseband signal;
   a finite impulse response (FIR) filter configured to assign a delay to the baseband signal; and
   a transmitter configured to convert a signal output from the FIR filter into a second radio signal transmitted toward the reception station from the antenna, and
   wherein the controller sets a delay amount in the FIR filter of the wireless device so that the second radio signal transmitted from each antenna included in the first and second relay stations has a delay different between the first and second relay stations.

2. The relay station according to claim 1, wherein when the relay station includes two or more antennas and two or more wireless devices corresponding to the two or more antennas, the controller sets a delay amount in the FIR filter included in each of the two or more wireless devices so that the second radio signal transmitted from each of the antennas included in the first and second relay stations has a delay different between the first and second relay stations and between the antennas included in the first and second relay stations.

3. The relay station according to claim 1, wherein the controller uses a first propagation delay serving as a propagation delay in a radio signal propagation path from the reception station to the relay station, a second propagation delay serving as a propagation delay in a radio signal propagation path from the transmission station to the relay station, and a signal processing delay in the relay station so as to obtain a maximum delay, and calculates a delay amount to be set in the FIR filter, for each antenna included in the relay station, within a range in which the maximum delay is not exceeded.

4. The relay station according to claim 3, wherein the controller calculates the maximum delay in which at least the first propagation delay, the second propagation delay, and the processing delay are subtracted from a cyclic prefix time used for communication with the transmission station and with the reception station by the relay station.

5. The relay station according to claim 3, wherein the controller calculates a delay amount to be set in the FIR filter included in each of the two or more wireless devices so that transmission timings of the second radio signal arrive at equal intervals with respect to the two or more antennas.

6. The relay station according to claim 3, wherein the controller randomly calculates the delay amount to be set in the FIR filter.

7. The relay station according to claim 1, wherein the controller acquires information indicating a delay amount corresponding to each antenna received from a control device of the relay station to set the delay amount in the FIR filter.

8. The relay station according to claim 1, wherein the controller performs weighting on the FIR filter so that self-interference related to reception of the first radio signal and transmission of the second radio signal are curbed.

9. The relay station according to claim 1, wherein the at least one antenna receives the first radio signal to which transmission diversity using at least one antenna has been applied by the transmission station.

10. The relay station according to claim 1, wherein the relay station acquires information indicating a relay start time calculated by a base station communicating with the relay station or a control device of the relay station, and sets, in the FIR filter, a delay amount corresponding to the relay start time.

11. A transmission method for a relay station operating as a first relay station and capable of executing non-regenerative relay for a first radio signal transmitted from a transmission station toward a reception station having one antenna, together with one or two or more second relay stations, the transmission method comprising:
   converting, by the relay station, the first radio signal received by at least one antenna included in the relay station into a baseband signal;
   assigning, by the relay station, a delay to the baseband signal using a finite impulse response (FIR) filter;
   converting, by the relay station, a signal output from the FIR filter into a second radio signal transmitted toward the reception station from the antenna; and
   setting, by the relay station, a delay amount in the FIR filter so that the second radio signal transmitted from each antenna included in the first and second relay stations has a delay different between the first and second relay stations.

12. The transmission method for the relay station according to claim 11, wherein when the relay station includes two or more antennas and two or more FIR filters corresponding to the two or more antennas, the relay station sets a delay amount in each of the two or more FIR filters so that the second radio signal transmitted from each of the antennas included in the first and second relay stations has a delay different between the first and second relay stations and between the antennas included in the first and second relay stations.

13. The transmission method for the relay station according to claim 11, wherein the relay station uses a first propagation delay serving as a propagation delay in a radio signal propagation path from the reception station to the relay station, a second propagation delay serving as a propagation delay in a radio signal propagation path from the transmission station to the relay station, and a processing delay of a signal in the relay station so as to obtain a maximum delay, and calculates a delay amount to be set in the FIR filter, for each antenna included in the relay station, within a range in which the maximum delay is not exceeded.

14. The transmission method for the relay station according to claim 13, wherein the relay station calculates the maximum delay in which at least the first propagation delay, the second propagation delay, and the processing delay are subtracted from a cyclic prefix time used for communication with the transmission station and with the reception station by the relay station.

15. The transmission method for the relay station according to claim 13, wherein the relay station calculates a delay amount to be set in the FIR filter included in each of the two or more wireless devices so that transmission timings of the second radio signal arrive at equal intervals with respect to the two or more antennas.

16. The transmission method for the relay station according to claim 13, wherein the relay station randomly calculates a delay amount to be set in the FIR filter.

17. The transmission method for the relay station according to claim 11, wherein the relay station acquires information indicating a delay amount corresponding to each antenna received from a control device of the relay station to set the delay amount in the FIR filter.

18. The transmission method for the relay station according to claim 11, wherein the relay station sets, in the FIR filter, a delay amount based on information indicating a relay start time calculated by a base station communicating with the relay station or a control device of the relay station.

19. A communications system comprising:
a reception station with one antenna;
a transmission station configured to transmit a first radio signal to the reception station; and
a plurality of relay stations capable of relaying the first radio signal to the reception station through non-regenerative relay,
wherein each of the plurality of relay stations includes:
at least one antenna;
a wireless device corresponding to the antenna; and
a controller configured to control an operation of the wireless device,
wherein the wireless device includes:
a receiver configured to convert the first radio signal received by the antenna into a baseband signal;
a finite impulse response (FIR) filter configured to assign a delay to the baseband signal; and
a transmitter configured to convert a signal output from the FIR filter into a second radio signal transmitted from the antenna to the reception station, and
wherein the controller sets a delay amount in the FIR filter of the wireless device so that the second radio signal transmitted from each antenna of the plurality of relay stations has a delay different from among the plurality of relay stations.

20. The communication system according to claim 19, wherein the relay station sets, in the FIR filter, a delay amount based on information indicating a relay start time calculated by a base station communicating with the relay station or a control device of the relay station.

* * * * *